(12) United States Patent
Monti et al.

(10) Patent No.: US 10,006,836 B2
(45) Date of Patent: Jun. 26, 2018

(54) METHOD AND APPARATUS FOR DETECTING DEFECTS ON TYRES IN A TYRE PRODUCTION PROCESS

(71) Applicant: PIRELLI TYRE S.P.A., Milan (IT)

(72) Inventors: Stefano Monti, Imola (Bologna) (IT); Valeriano Ballardini, Imola (Bologna) (IT); Fabio Regoli, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days. days.

(21) Appl. No.: 15/537,863

(22) PCT Filed: Dec. 18, 2015

(86) PCT No.: PCT/IB2015/059771
§ 371 (c)(1),
(2) Date: Jun. 19, 2017

(87) PCT Pub. No.: WO2016/103131
PCT Pub. Date: Jun. 30, 2016

(65) Prior Publication Data
US 2017/0350794 A1    Dec. 7, 2017

(30) Foreign Application Priority Data

Dec. 22, 2014 (IT) .............................. MI2014A2212

(51) Int. Cl.
| | | |
|---|---|---|
| *G01M 17/02* | (2006.01) | |
| *G06T 7/00* | (2017.01) | |
| *B29D 30/00* | (2006.01) | |

(52) U.S. Cl.
CPC ........... *G01M 17/027* (2013.01); *G06T 7/001* (2013.01); *B29D 30/00* (2013.01); *G06T 2207/20036* (2013.01); *G06T 2207/20192* (2013.01)

(58) Field of Classification Search
None
See application file for complete search history.

(56) References Cited

U.S. PATENT DOCUMENTS

| | | |
|---|---|---|
| 5,347,588 A | 9/1994 | Wilson |
| 9,002,130 B2 | 4/2015 | Noyel et al. |

(Continued)

FOREIGN PATENT DOCUMENTS

| | | |
|---|---|---|
| EP | 0536705 A2 | 4/1993 |
| EP | 1477765 A1 | 11/2004 |

(Continued)

OTHER PUBLICATIONS

PCT International Search Report and Written Opinion for PCT/IB2015/059771 filed on Dec. 18, 2015 in the name of Pirelli Tyre S.P.A. dated Apr. 4, 2016.

(Continued)

*Primary Examiner* — Andre Allen
(74) *Attorney, Agent, or Firm* — Steinfl + Bruno LLP

(57) ABSTRACT

A method and apparatus for detecting defects on tires in a tire production process. The method includes: receiving a reference image of a surface portion of a reference tire substantially defects-free; providing a sample tire to be analyzed; illuminating a surface portion of the sample tire with a raking light source; acquiring a sample image of the illuminated surface portion of the sample tire; extracting the edges from the reference image and from the sample image and respectively generating an edge reference image and an edge sample image; carrying out a dilation of the edges of the edge reference image and generating therefrom a dilated edge reference image; comparing the edge sample image with respect to the dilated edge reference image and generating an edge image of possible defects; and identifying the edges in the edge image of possible defects.

16 Claims, 22 Drawing Sheets

(56) References Cited

U.S. PATENT DOCUMENTS

| | | | |
|---|---|---|---|
| 2005/0058333 A1 | 3/2005 | Kaneko et al. | |
| 2011/0013823 A1* | 1/2011 | Joly | G01M 17/027 |
| | | | 382/141 |
| 2014/0283591 A1* | 9/2014 | Takahashi | G01B 11/245 |
| | | | 73/146 |
| 2015/0043780 A1 | 2/2015 | Noyel et al. | |
| 2016/0258842 A1* | 9/2016 | Taylor | G01M 17/027 |
| 2017/0160079 A1 | 6/2017 | Takebuchi | |

FOREIGN PATENT DOCUMENTS

| | | | |
|---|---|---|---|
| JP | H05-196557 A | 8/1993 | |
| JP | 2003-240521 A | 8/2003 | |
| JP | 2007-47089 A | 2/2007 | |
| JP | 2016-6386 A | 1/2016 | |
| WO | 2012/156260 A1 | 11/2012 | |
| WO | WO 2014198777 A1 * | 12/2014 | G01M 17/027 |

OTHER PUBLICATIONS

Japanese Patent Official Office Action for Japanese Patent Application No. 2017-532624. dated Oct. 24, 2017. 6 pages. (English Translation + Japanese Original).

* cited by examiner

METHOD AND APPARATUS FOR DETECTING DEFECTS ON TYRES IN A TYRE PRODUCTION PROCESS

CROSS REFERENCE TO RELATED APPLICATIONS

The present application is the U.S. national stage of International Patent Application PCT/IB2015/059771 filed internationally on Dec. 18, 2015, which, in turn, claims priority to Italian Patent Application No. MI2014A002212 filed on Dec. 22, 2014.

TECHNICAL FIELD OF THE INVENTION

The present invention relates to a method and apparatus for detecting substantially monodimensional defects on tyres, such as for example cuts or thin projections that can occur on the surface of the tyres during the production process.

PRIOR ART

In the scope of the tyre production processes, the need has been perceived to perform quality controls on the tyres themselves, for the purpose of preventing defective tyres from being placed on the market and in a manner so as to progressively adjust the employed machinery, optimizing the execution of the operations carried out in the production process.

The known quality controls include, for example, those executed by specialized human operators who spend a predetermined time (e.g. comprised between 30 seconds and 60 seconds) in order to execute a visual and tactile analysis of the tyre. If the operator, in light of his/her own experience and sensitivity, suspects that the analysed tyre does not comply with a specific quality standard, the tyre itself is removed from the production line and is subjected to further more detailed controls, which can occur by means of a human operator and/or by means of suitable dedicated equipment.

SUMMARY OF THE INVENTION

In the scope of tyre controls, the Applicant has addressed the problem of detecting the possible presence of monodimensional defects on a surface of the tyre by means of optical acquisition of digital images and their subsequent processing. The Applicant has observed that for the control to be employed "in line" within a plant for producing tyres, it is necessary for the control itself to be precise but at the same time executed in limited times and with limited costs. In such context, the computational requirement of the processing algorithms plays a crucial role, since when this is excessive, the control times are unacceptably lengthened and/or the calculation capacity makes control impracticable.

The detection of the presence of defects on the tyres can be typically carried out by means of the comparison between the sample tyre to be analysed and a defects-free reference tyre: if an element is present on the sample tyre, but is not present on the reference tyre, said element is considered a defect.

The Applicant has however observed that such comparison is complicated and/or not very reliable due to several intrinsic variabilities of the tyre production, and in particular due to the presence of several substantially non-removable elements, which typically do not negatively affect the tyre performances, and which can vary as type and as position. Such elements, which cannot be classified as "defects", can for example be:

- discontinuities caused by the joint lines between adjacent sectors of the mould of the tread;
- surface imperfections caused by the mould, which is dirtied during its use and must be cleaned when such imperfections reach dimensions that are no longer acceptable;
- reliefs with circle (or arc) form caused by the presence of air outlets, which have the purpose of allowing the outflow of air (but not of the rubber of the compound) during moulding;
- coloured writing and lines in different zones, such as writing on the sidewall of the tyre, that are moulded on the tread band before being built in the finished tyre and that can still be visible when the tyre is finished;
- end-of-life indicators (TWI=Tread Wear Indicator) within grooves of the tread;
- wear indicators for the winter tyres (known as SWI=Snow Wear Indicator).

In addition the Applicant has detected that even the variation of the moulds used can be a cause of variabilities introduced between each tyre, since the moulds can be provided by different producers, or even in the field of a supply executed by the same producer these can contain intrinsic variabilities due to a production carried out in different periods. For example, the joint lines between the sectors can be differently positioned on tyres that have been obtained with different moulds; consequently, the subdivision into sectors can be different among different moulds, i.e. the position of the joint lines between the sectors can be different among tyres of the same type obtained with different moulds.

Finally the Applicant has further detected that the process of alignment between the acquired sample image of the sample tyre and the reference image of the reference tyre, typically used for carrying out a comparison, may not be very precise. In this case, a same element (e.g. a discontinuity caused by a joint line between adjacent sectors of the tread mould) can be detected in slightly different positions between the acquired sample image and the reference image. Consequently, the comparison operation can detect that said element is present on the sample tyre but not on the reference tyre, therefore generating a false indication of the presence of a defect.

The Applicant has therefore addressed the problem of controlling and detecting the presence of defects on tyres in a reliable manner, filtering out as much as possible the generation of false alarms, in particular false alarms generated by the intrinsic variabilities between each tyre introduced by the normal production process.

The Applicant has found that it is possible to solve such problem, by means of a suitable comparison between the edges extracted from the acquired image of the surface of the sample tyre (i.e. the tyre to be analysed) and the extracted and dilated edges of the image of the surface of a reference tyre (i.e. a defects-free tyre). In particular, the dilation operation of the edges of the acquired image of the surface of the reference tyre allows compensating for the effect of the above mentioned intrinsic variabilities, making the defect detection procedure particularly reliable.

The Applicant has also found that it is possible to make the detection of the presence of defects on tyres even more reliable, by means of a suitable restoration of the edge portions detected on the acquired image of the sample tyre surface which are situated in the proximity of the dilated edges on the acquired image of the surface of the sample tyre.

With the term "edge" of an object in an image, it is intended the line (not necessarily rectilinear) or the curve (open or closed) of separation between an object and the background, or between one object and another object.

With the term "dilation" of the edges of an image, it is intended that portions of the image placed in proximity of such edges are also themselves assigned to the considered edges, thus obtaining edges with greater "thickness" than the starting edges.

According to a first aspect, the invention relates to a method for detecting defects on tyres in a tyre production process.

The method comprises:

a) receiving a reference image of a surface portion of a reference tyre substantially defects-free;
b) providing a sample tyre to be analysed;
c) illuminating a surface portion of the sample tyre with a circumferential raking light source;
d) acquiring a sample image of the illuminated surface portion of the sample tyre;
e) extracting the edges from the reference image and from the sample image and generating an edge reference image comprising the edges included in the reference image and an edge sample image comprising the edges included in the sample image, respectively;
f) carrying out a dilation of the edges of the edge reference image and generating therefrom a dilated edge reference image;
g) comparing the edge sample image with respect the dilated edge reference image and generating an edge image of possible defects comprising the edges that are included in the edge sample image and are not included in the dilated edge reference image;
h) identifying as possible defects the edges included in the edge image of possible defects.

Preferably, the method for detecting defects on tyres further comprises:

i) selecting a first edge from the edge image of possible defects, identifying in the edge sample image a first edge corresponding to the first selected edge and verifying the presence of at least one portion of a second edge in the edge sample image, wherein a portion of the second edge is in the proximity of at least one portion of the first corresponding edge;
j) generating an edge image of restored possible defects comprising the edges of the edge image of possible defects and comprising the second identified edge;
k) repeating the preceding steps i)-j) for further first edges of the edge image of possible defects;
l) identifying as defects the edges included in the edge image of restored possible defects.

According to a second aspect, the invention relates to an apparatus to detect defects on tyres in a tyre production line. The apparatus comprises:

a support and movement member having a support adapted to support a sample tyre and rotate it around a rotation axis thereof;
a light source configured to emit a light radiation for raking illuminating a portion of the surface of the sample tyre during its rotation;
at least one camera configured to acquire a sample image of the illuminated surface portion of the sample tyre during its rotation;

a memory configured to store a reference image of a surface portion of a reference tyre substantially defects-free;
a processing unit configured to:
receive the sample image of the illuminated surface portion of the sample tyre;
extract the edges from the reference image and from the sample image and generate an edge reference image comprising the edges included in the reference image and an edge sample image comprising the edges included in the sample image, respectively;
carry out a dilation of the edges of the edge reference image and generate therefrom a dilated edge reference image;
compare the edge sample image with respect to the dilated edge reference image and generate an edge image of possible defects comprising the edges that are included in the edge sample image and are not included in the dilated edge reference image;
identify as possible defects the edges included in the edge image of possible defects.

Preferably, the processing unit of the apparatus to detect defects on tyres is further configured to:

select a first edge from the edge image of possible defects, identify in the edge sample image a first edge corresponding to the first selected edge and verify the presence of at least one portion of a second edge in the edge sample image, wherein a portion of the second edge is in the proximity of at least one portion of the first corresponding edge;
generate an edge image of restored possible defects comprising the edges of the edge image of possible defects and comprising said further edge;
repeat said selection of the first edge, said identification, said verification and said generation for further first edges of the edge image of possible defects;
identify as defects the edges included in the edge image of restored possible defects.

The Applicant has found it advantageous in step i) to measure the proximity of the second edge with respect to the first corresponding edge by means of calculation of the distance between points belonging to the first corresponding edge and points belonging to the second edge. Therefore, in step i), the calculation of the proximity between the first corresponding edge and the second edge comprises measuring a plurality of distances by means of measuring the distance between points belonging to the first corresponding edge and points belonging to the second edge and comprises identifying the minimum distance between the plurality of measured distances; in addition, in step i), said verification of the presence of the second edge occurs if the minimum distance is less than or equal to the value of a distance threshold.

The Applicant has found it advantageous in step i) to measure the proximity between the first corresponding edge and the second edge by further taking into account the orientation of the first corresponding edge and of the second edge: in this manner, the probability of committing errors in substituting a first corresponding edge with a second edge that were not obtained from a same edge is reduced.

In this case step i) comprises:

i1) associating, with each first corresponding edge of the edge sample image defects, an orientation defined as the direction substantially perpendicular to the average direction of the considered edge;

i2) associating, with each second edge of the edge sample image, an orientation defined as the direction substantially perpendicular to the average direction of the considered edge;

i3) verifying if the orientation of the first corresponding edge is substantially parallel to the orientation of the second selected edge;

and wherein said generation in step j) is executed if the verification in step i3) is positive.

The Applicant has also found that, in the edge image of restored possible defects, not only can edges of possible defects be present, but (in steps i) and j)) a part of the non-defective elements of the sample tyre can also be re-added, which must be eliminated in order to prevent them from being erroneously considered edges of possible defects.

In this case, the method further comprises, after step k), the following steps:

receiving the edge image of restored possible defects;
identifying the presence of non-defective elements in the edge image of restored possible defects;
eliminating the identified non-defective elements.

The Applicant has also found a particular processing of the edges of the images which allows identifying as defects the edges which have a sufficiently large length value. In this case, step l) of the method comprises:

l1) selecting an edge from the edge image of restored possible defects and generating a plurality of edge measurement profiles respectively centred on a plurality of different points belonging to the selected edge, the plurality of edge measurement profiles being associated with respective pluralities of values calculated as a function of the light intensity values of respective portions of the sample image respectively centred on said plurality of points;

l2) selecting an edge measurement profile from the plurality of edge measurement profiles and identifying a possible defective point as a function of the trend of the selected edge measurement profile;

l3) repeating the step l2) for further edge measurement profiles of the selected edge;

l4) repeating the steps l1)-l3) for further edges of the edge sample image;

l5) selecting an edge from the edge image of restored possible defects and calculating the number of the possible defective points belonging to the selected edge;

l6) marking the selected edge as a defect if said number of the possible defective points is greater than the value of a defect threshold;

l7) repeating the steps l5)-l6) for further edges selected from the edge image of restored possible defects;

l8) generating a measured edges image comprising the edges marked as defects;

l9) identifying as defects the edges included in the measured edges image.

For the purpose of simplifying the calculation procedures, at the same time preventing the grooves present on the tread of the sample tyre from being identified as defects or from giving rise to a generation of false defects due to light variations, the method comprises, between step d) and e), the step d1) of generating a filled sample image obtained by means of filling the portions of the sample image representative of grooves present on the tread of the sample tyre and generating a filled reference image obtained by means of filling the portions of the reference image representative of grooves present on the tread of the reference tyre. In addition, step e) carries out the extraction of the edges from the filled reference image and from the filled sample image and generates an edge reference image comprising the edges included in the filled reference image and an edge sample image comprising the edges included in the filled sample image respectively.

With the term "filling" it is intended that sample image or reference image portions representative of a groove of the tread are substituted with portions having values of light intensity predefined or calculated as a function of the light intensity values in portions adjacent to the considered groove.

Preferably, if the identification of the edges with sufficient length is obtained by generating the plurality of edge measurement profiles and additionally the filling is carried out of the grooves present on the tread, in step l1) the plurality of edge measurement profiles being associated with respective pluralities of calculated values is calculated as a function of the light intensity values of respective portions of the filled sample image respectively centred on said plurality of points.

Different criteria can be used for identifying the possible defective points in step l2).

For example, a first criterion allows reducing the computational cost, by means of an analysis of the distribution of the maximum and minimum values of the light intensity.

According to the first criterion, step l2) further comprises:

l2.1) calculating the minimum value of the values of the central portion of the selected edge measurement profile and storing the respective position of the pixel;

l2.2) calculating the maximum value of the values of the central portion of the selected edge measurement profile and storing respective position of the pixel;

l2.3) if the position of the pixel corresponding to the maximum value is subsequent to the position of the pixel corresponding to the minimum value, identifying as possible defective point the point on which the selected edge measurement profile is centred;

l2.4) if the position of the pixel corresponding to the maximum value is preceding the position of the pixel corresponding to the minimum value, identifying as a non-defective point the point on which the selected edge measurement profile is centred.

Another criterion allows taking into account the normal variability of the light intensity of the image acquisition process.

According to such criterion, step l2) further comprises:

l2.1) calculating the minimum value of the values of the central portion of the selected edge measurement profile;

l2.2) calculating the maximum value of the values of the central portion of the selected edge measurement profile;

l2.3) calculating a first value and a second value representative of the values of side portions of the selected edge measurement profile;

l2.4.1) if the minimum value is greater than the sum of the first value and the value of a first side threshold and is greater than the sum of the second value and the value of a second side threshold, identifying as a non-defective point the point on which the selected edge measurement profile is centred;

l2.4.2) if the minimum value is smaller than the sum of the first value and the value of the first side threshold and is smaller than the sum of the second value and the value of the second side threshold, identifying as a defective point the point on which the selected edge measurement profile is centred;

l2.5.1) if the maximum value is smaller than the sum of the first value and the value of a third side threshold and is smaller than the sum of the second value and the value of a fourth side threshold, identifying as a non-defective point the point on which the selected edge measurement profile is centred;

l2.5.2) if the maximum value is greater than the sum of the first value and the value of the third threshold and is greater than the sum of the second value and the value of the fourth side threshold, identifying as a defective point ($P_{pd\text{-}j}$) the point on which the selected edge measurement profile is centred.

A further criterion allows taking into account defects that have a non-negligible thickness, ignoring scratches or small isolated holes.

According to such criterion, step l2) further comprises:

l2.1) calculating a first value and a second value representative of the values of side portions of the selected edge measurement profile;

l2.2) calculating the number of pixels of the selected edge measurement profile having values smaller than the sum of the first value and the value of a first thickness threshold and having values smaller than the sum of the second value and the value of the first thickness threshold;

l2.3) calculating the number of pixels of the selected edge measurement profile having values greater than the sum of the first value and the value of a second thickness threshold and having values greater than the sum of the second value and the value of the second thickness threshold;

l2.4.1) if the sum of the number of pixels calculated in steps l2.2), l2.3) is smaller than the value of a third thickness threshold, identifying as a non-defective point the point on which the selected edge measurement profile is centred;

l2.4.2) if the sum of the number of pixels calculated in steps l2.2), l2.3) is greater than or equal to the value of the third thickness threshold, identifying as a defective point the point on which the selected edge measurement profile is centred.

Preferably, the value of the defect threshold is equal to a percentage of the length of the edge selected from the edge image of restored possible defects.

Preferably the method further comprises, between step d) and e), a step of filtering out coloured writing and lines from the sample image and from the reference image.

Preferably, a compensation of the sample image is carried out: this allows increasing the contrast of the sample image and facilitates the subsequent process of extraction of the edges from the sample image.

In this case the method further comprises, between step d) and e), the step of carrying out a compensation of the brightness of the sample image.

The method and apparatus can be used for detecting substantially monodimensional cuts on portions of the external surface of a sample finished or green tyre (i.e. a tyre which in the production process has not yet been subjected to vulcanisation).

In particular, the method and apparatus can be used for detecting substantially monodimensional cuts on portions of the surface of the tread and of the external shoulder (i.e. the curved surface comprised between the external zone of the tread and the sidewall).

In the case of a sample green tyre, the external surface at the crown of the green tyre can be analysed (i.e. in the zone of the tread), which does not have the tread design and hence is substantially smooth.

According to the second aspect of the invention, the processing unit of the apparatus to detect defects on tyres is further configured to:

select an edge from the edge image of restored possible defects and generate a plurality of edge measurement profiles respectively centred on a plurality of different points belonging to the selected edge, the plurality of edge measurement profiles being associated with respective pluralities of values calculated as a function of the light intensity values of respective portions of the sample image respectively centred on said plurality of points;

select an edge measurement profile from the plurality of edge measurement profiles and identify a possible defective point as a function of the trend of the selected edge measurement profile;

repeat, for further edge measurement profiles of the selected edge, the identification of the possible defective points;

repeat, for further edges of the edge image of restored possible defects, the identification of the possible defective points;

select an edge from the edge sample image of restored possible defects and calculate the number of the possible defective points belonging to the selected edge;

mark the selected edge as a defect if said number of the possible defective points is greater than the value of a defect threshold;

repeat, for further edges selected from the edge image of restored possible defects, the calculation of the number of the possible defective points and the marking of the selected edge;

generate a measured edges image comprising the edges marked as defects.

Preferably, the apparatus to detect defects comprises a screen configured to display a representation of the edges marked as defects.

According to a third aspect, the invention relates to a computer program comprising software code portions adapted to perform at least steps e)-l) of the method according to the first aspect of the invention, when said program is run on at least one computer.

According to a fourth aspect, the invention relates to a process for producing tyres. The process comprises the operations of:

building green tyres;

moulding and vulcanising the green tyres;

controlling the green and/or vulcanised tyres according to the method of the first aspect of the invention.

According to a fifth aspect, the invention relates to a tyre production line. The line comprises:

a working station;

a moulding and curing station;

a control station comprising an apparatus to detect defects on the tyres exiting from said working station and/or from said moulding and curing station according to the second aspect of the invention.

BRIEF DESCRIPTION OF THE DRAWINGS

Further characteristics and advantages of the invention will be clearer from the following description of a preferred embodiment and variants thereof provided by way of example with reference to the enclosed drawings, wherein.

DETAILED DESCRIPTION OF THE INVENTION

It is observed that in the present description, identical or analogous blocks, components or modules are indicated in the figures with the same reference numbers.

Figure 1A:
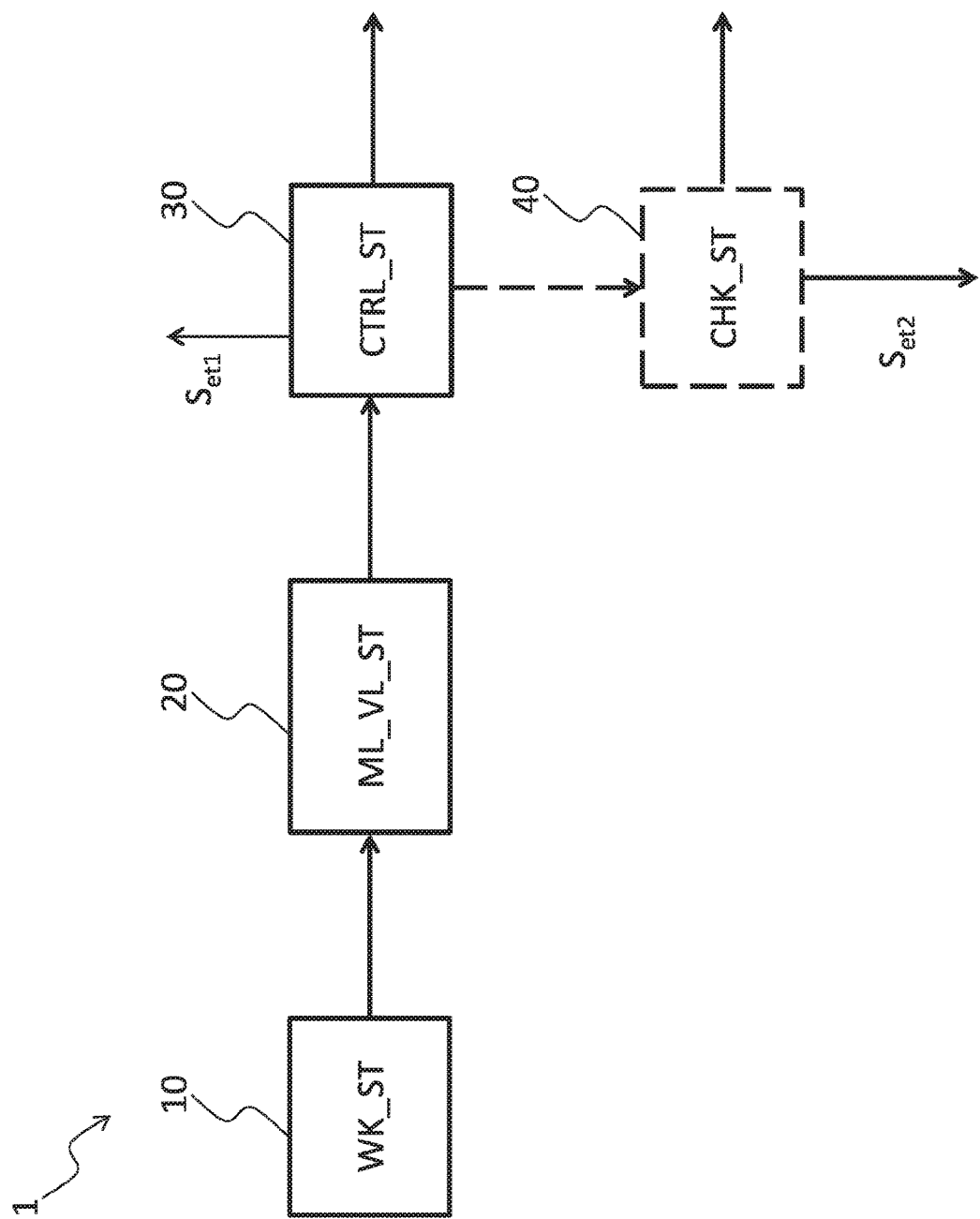
FIGS. 1A-1B schematically show a tyre production line according to one embodiment of the invention.

With reference to FIG. 1A, a tyre production line 1 is shown according to one embodiment of the invention.

The production line 1 comprises a working station 10, a moulding and curing station 20, a control station 30 and, preferably, a verification station 40.

The tyres are treated with continuous cycle, passing sequentially through the working station 10, the moulding and curing station 20, the control station 30 and also possibly the verification station 40.

The working station 10 carries out a green tyre building operation.

The moulding and curing station 20 receives the green tyres from the working station 10 and then carries out a tyre moulding operation by means of moulds, and subsequently it carries out a vulcanisation operation, thus obtaining the finished tyres.

The control station 30 receives the finished tyres from the moulding and curing station 20 and carries out an operation of control of the finished tyres for detecting the possible presence of substantially monodimensional defects thereon, as will be explained more in detail hereinbelow.

Hereinbelow, in the description and claims, the finished tyres which are subjected to verification in order to detect the possible presence of substantially monodimensional defects will be indicated as "sample tyres".

By substantially monodimensional defect, it is intended a defect with the geometric form of a substantially rectilinear or curvilinear open line (or formed by a set of curvilinear sections), in which the value of a first dimension (typically the "length") is much greater than the value of a second size (e.g. the "width").

In particular, the substantially monodimensional defect can be a cut, i.e. a narrow opening on the surface of the sample finished tyre caused for example by the sliding between two materials of the rubber or by the compound of the rubber which is not perfectly closed.

Preferably, if the cut is a substantially rectilinear line, this forms an angle comprised between about 0 and about 45 degrees with respect to the direction defined by the rotation axis of the sample tyre; in other words, the cut can have an axial direction or it can form an angle smaller than or equal to about 45 degrees with respect to the axial direction.

For example, a cut has width comprised between about 0.2 millimeters and about 0.5 millimeters and (in the case of a rectilinear form) a length comprised between about 1 millimeter and about 3 millimeters.

The substantially monodimensional defect can also be a thin projection with respect to the surface of the considered portion of the sample tyre, having a much lower thickness than its length.

Preferably, the control station 30 is such to generate a test result signal $S_{et1}$ indicative of the result of the control operation on the sample finished tyres. For example, the test result signal $S_{et1}$ can assume the following values:

"good": it indicates that the sample finished tyre lacks substantially monodimensional defects and hence can be placed on the market;

"re-working": it indicates that the sample finished tyre has a substantially monodimensional defect of small size, which can be corrected by means of a further processing and subsequently it can be placed on the market;

"defective": it indicates that the sample finished tyre has a substantially monodimensional defect of large size, which thus must be discarded and cannot be placed on the market.

If the test result signal $S_{et1}$ assumes the "good" value, the sample finished tyre advances in the production line 1 to a subsequent station; for example, the sample finished tyre is preserved in a warehouse.

If the test result signal $S_{et1}$ assumes the "defective" or "re-working" value, the sample finished tyre is unloaded from the control station 30 and is loaded into the verification station 40.

Preferably, if the test result signal $S_{et1}$ assumes the "defective" or "re-working" value, the control station 30 is such to generate an image (e.g. two-dimensional, i.e. a photograph) which represents the portion of the sample tyre which has said substantially monodimensional defect of small or large size. In this case, the production line 1 further comprises a screen for displaying the image that contains the substantially monodimensional defect.

The verification station 40 receives from the control station 30 the sample finished tyres which were considered defective and carries out a further operation of verification of the defective sample finished tyres, e.g. by means of a specialized operator. Preferably, the verification station 40 is such to generate a second test result signal $S_{et2}$ indicative of the result of the control operation on the sample finished tyres. For example, the second test result signal $S_{et2}$ can assume the following values:

good: it indicates that the sample finished tyre lacks substantially monodimensional defects, hence it can be placed on the market;

re-working: it indicates that the sample finished tyre has a substantially monodimensional defect of small size, which can be corrected by means of a further processing and subsequently it can be placed on the market;

defective: it indicates that the sample finished tyre has a substantially monodimensional defect of large size, which thus must be discarded and cannot be placed on the market.

It is observed that the presence of the verification station 40, along with the presence of the work station 10 and moulding/curing station 20, is not essential for the purpose of performing the invention. For example, the verification station 40 might not be present and the sample finished tyres considered defective by the control station 30 are unloaded therefrom and are discarded.

Figure 1B:
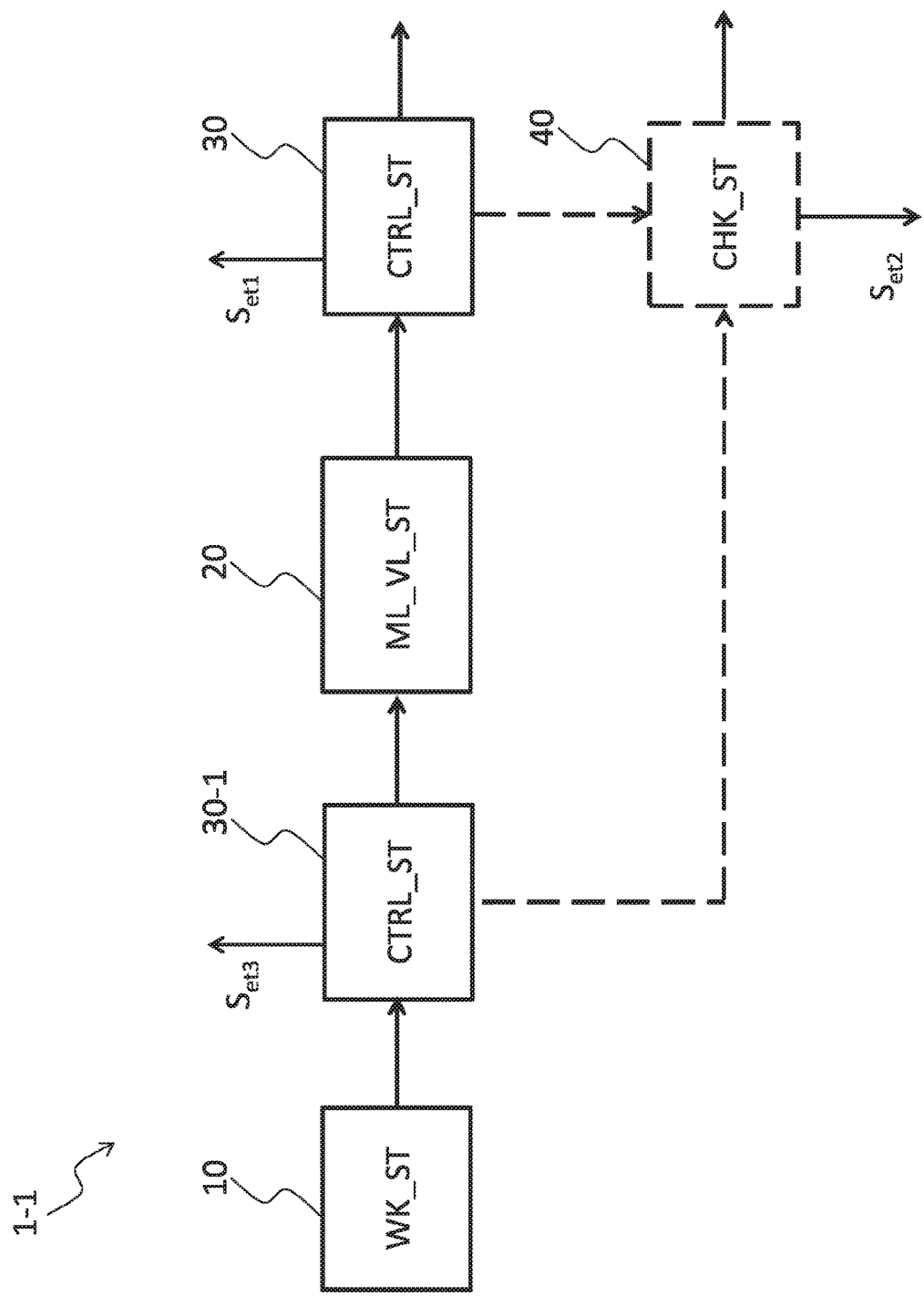

According to a variant of the embodiment of the invention shown in FIG. 1B, the production line 1-1 is such to further allow the control of the presence of substantially monodimensional defects on sample green tyres.

In this case the production line 1-1 comprises a second control station 30-1 interposed between the working station 10 and the moulding and curing station 20.

The second control station 30-1 has a function similar to that of the control station 30, with the difference that it is such to carry out the control of the presence of substantially monodimensional defects on sample green tyres instead of on sample finished tyres.

The control station 30 comprises an apparatus 100 to detect substantially monodimensional defects on sample finished tyres.

Figure 2:
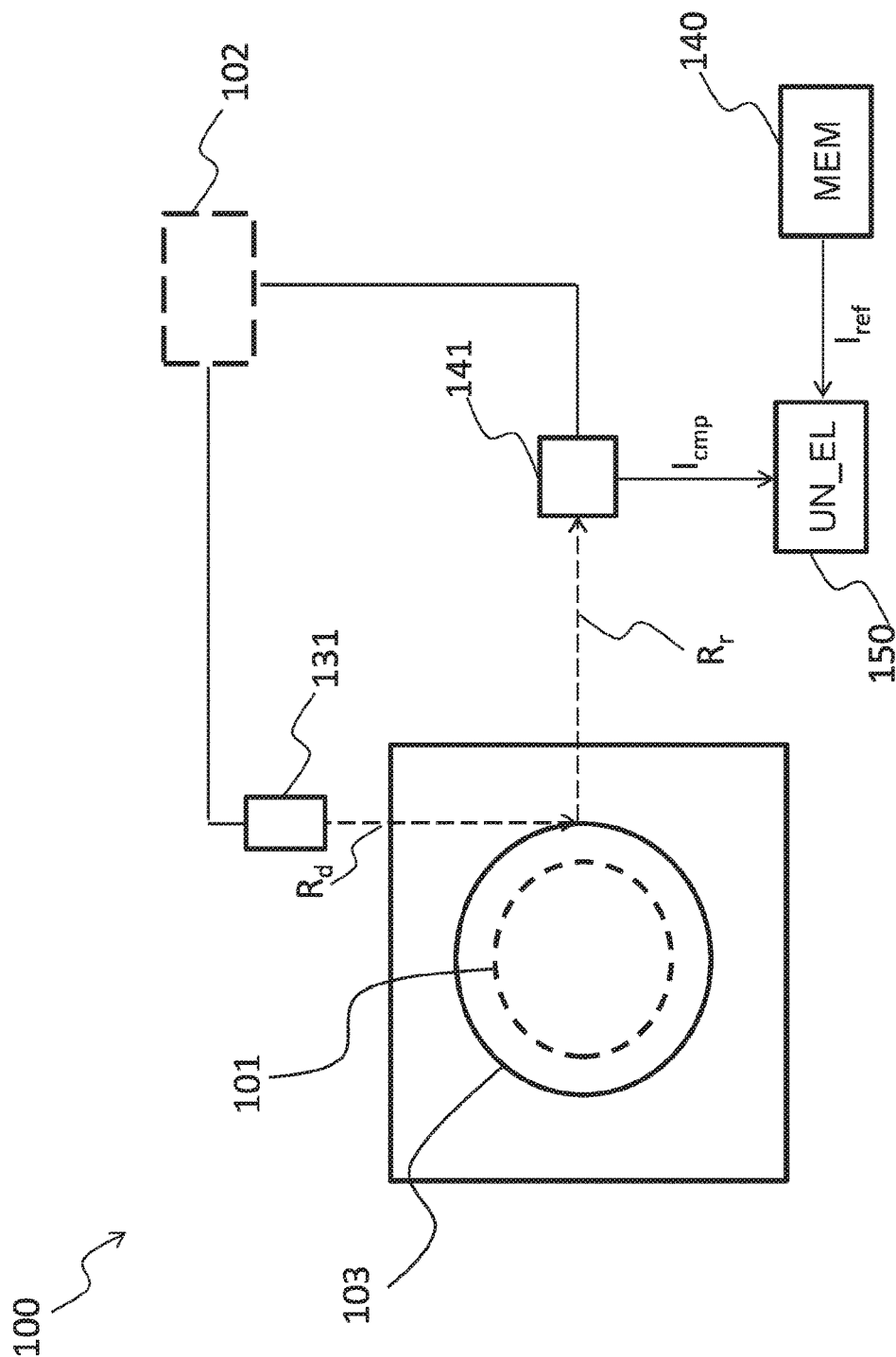
FIG. 2 shows a block diagram of an apparatus to detect defects on tyres in the tyre production line according to the embodiment of the invention.

In one embodiment, the apparatus 100 is shown in FIG. 2 with a block diagram.

The apparatus 100 comprises a support and movement member 101 having the function of supporting the sample tyre 103 and rotating it around a rotation axis thereof.

The apparatus 100 also comprises a light source 131 and a camera 141.

The light source 131 is such to emit a light radiation $R_d$ in order to illuminate at least one portion of the surface of the sample finished tyre 103 in a raking direction, preferably in circumferential direction: this allows distinguishing, on the analysed surface of the sample tyre 103, the zones which have reliefs due to the non-defective elements of the sample tyre 103 from the zones which have cavities due to the cuts which must be considered defects, as will be explained more in detail hereinbelow.

Analogously, the light radiation $R_d$ with circumferential raking direction allows distinguishing, on the analysed surface of the sample tyre 103, the zones which have reliefs due to the non-defective elements of the sample tyre 103 from the zones with thin projections that must be considered defects.

With the term "raking" direction, it is intended that the light radiation $R_d$ has a light beam which is propagated in a straight line with a direction that is substantially tangent to the surface portion to be analysed of the sample finished tyre 103.

With the term "circumferential" direction, it is intended that the direction of the beam of the light radiation $R_d$ is substantially tangent to the points of the circumference defined by the surface of the tread of the sample tyre 103, in which said surface of the tread is extended around the rotation axis of the sample tyre 103, as schematically shown in FIG. 2 by the direction of the light radiation $R_d$ with respect to the circumference 103.

The emitted light radiation $R_d$ can be incoherent white visible light or coherent narrow-band light (e.g. a laser).

The camera 141 is such to acquire a digital image of the surface portion of the finished tyre illuminated by the light source 131, by means of the detection of the light radiation $R_r$ reflected by said surface portion.

In the present description, by "digital image" it is intended a set of data, typically included in a computer file, in which each coordinate of a finite set (typically two-dimensional or generally matrix, e.g. N rows×M columns) of spatial coordinates (each typically corresponding to a pixel) is associated with a corresponding set of numeric values.

For example, in the monochromatic images (such as those in grey scale), such set of values coincides with a single value in a finite scale, such value being representative of the level of light intensity of the respective spatial coordinate. By light intensity it is intended the optical power per unit of surface area (also called luminance), measured in $W/m^2$.

In the colour images, the set of values represents the level of light intensity of the primary colours. In the RGB colour model, three values are present that represent the light intensity of the red, green and blue components. In the CMYK code, four values are present which represent the cyan, magenta, yellow and black components. In the HSV code, three values are present which represent the three parameters of hue, saturation and intensity value.

In particular, the camera 141 is such to generate an acquisition signal carrying values indicative of the acquired image of the surface portion of the sample tyre 103, which will be indicated hereinbelow with sample image $I_{cmp}$.

Figure 6A:
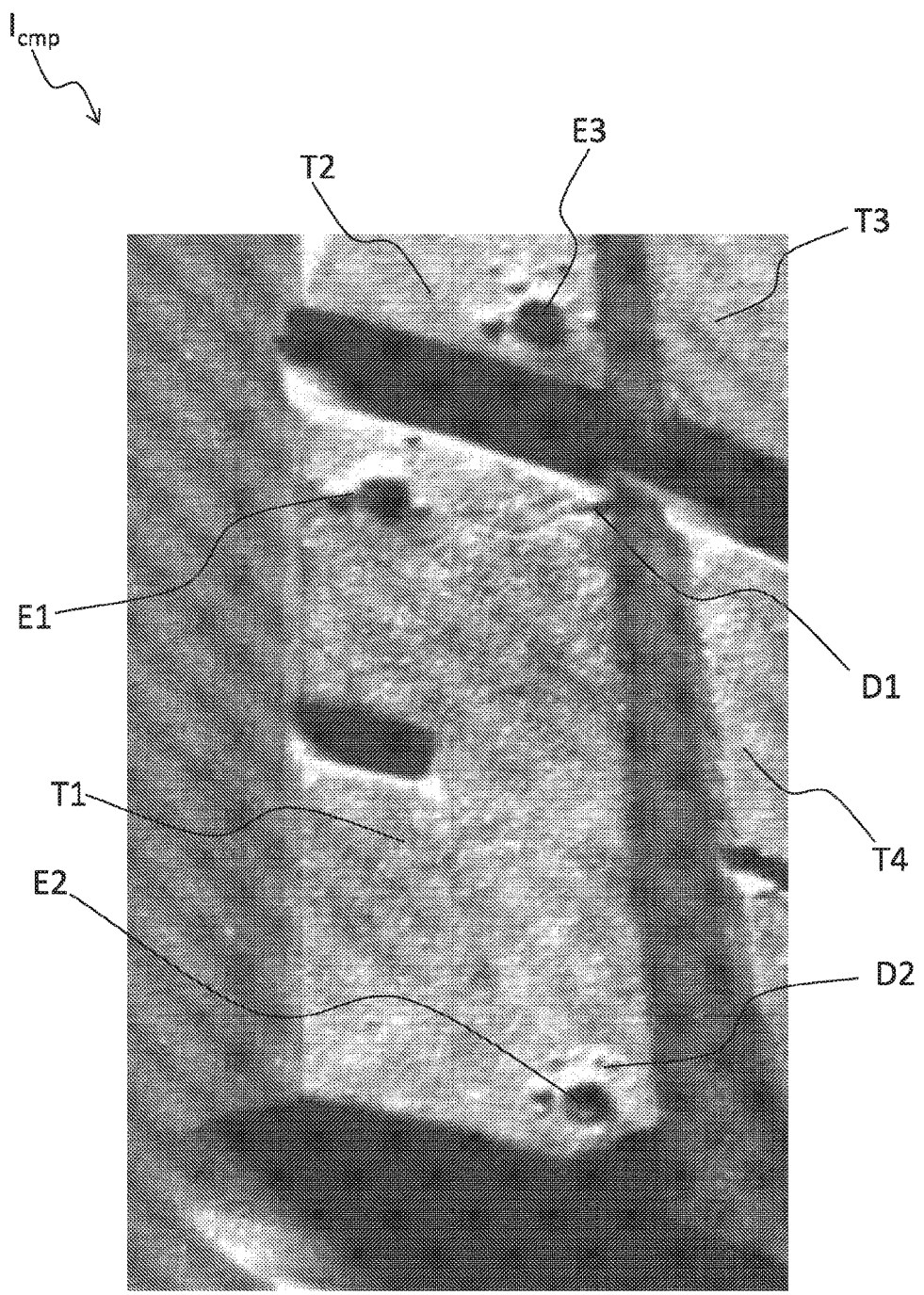
FIGS. 6A-6G show the images of surface portions of a sample tyre obtained by means of the method for detecting defects according to the first embodiment of the invention.

FIG. 6A shows an example of a sample image $I_{cmp}$ that represents a portion of the surface of the tread of the sample tyre 103.

Said surface portion comprises a block T1 which is fully visible and comprises three adjacent blocks T2, T3, T3 that are partially visible.

It is possible to observe that, on the block T1, a first cut D1, a second cut D2 and two non-defective elements E1, E2 which are circle-shaped reliefs are present.

In addition, also on block T2 a non-defective element E3 which is a circle-shaped relief is present.

It is also possible to observe that the first cut D1 is situated very close to the edge of the block T1, but more generally the first cut D1 can also be positioned far from the edge of the block T1.

It is observed that the length of the first cut D1 is greater than the length of the second cut D2, i.e. the first cut D1 has a non-negligible length (hence it can be classified as a defect), while the second cut D2 has a negligible length (e.g. D2 is a scratch), which does not negatively affect the performances of the tyre, and hence cannot be classified as a defect.

More particularly, the acquired sample image $I_{cmp}$ is represented in digital form, with a matrix of points commonly indicated with pixels, each of which is characterized by the respective position in the matrix and by the level of light intensity. Preferably, the acquired sample image $I_{cmp}$ is a colour image and the used colour model is RGB, hence for each pixel of the colour image three values are associated which represent the light intensity of the red, green and blue components.

Advantageously, the apparatus 100 comprises a plurality of cameras in order to acquire the image of a plurality of bands of the tyre portion: in this manner, the time required for acquiring the images is reduced, and hence it is possible to speed up the in-line control of the tyres. For example, such plurality of cameras can be arranged in a line, to form an array of cameras side-by-side each other.

Preferably, the apparatus 100 further comprises a robotic arm 102 having a free end on which the light source 131 and the camera 141 are rigidly mounted.

The apparatus 100 further comprises a processing unit 150 having the function of executing the control of the sample tyres 103 for the purpose of detecting the presence of substantially monodimensional defects thereon.

Preferably, the apparatus 100 further comprises a memory 140 for storing values representative of a reference image $I_{ref}$ of a surface portion of a reference tyre. The reference tyre is of the same type as the sample tyre, i.e. it has the same size and (in the case of a finished tyre) same tread design and it has been selected so as to be defects-free, in particular lacking cuts and/or thin projections. The reference tyre also has elements intrinsically derived from the tyre production process, which do not negatively affect the performances of the tyres themselves, and which therefore must not be considered defects.

Therefore configuration information composing the reference image $I_{ref}$ is stored in advance into the memory 140.

For example, the memory 140 is such to store, for each spatial coordinate of the reference image $I_{ref}$, three values which represent the light intensity of the red, green and blue components of the RGB colour model.

The processing unit 150 is for example a microprocessor.

In particular, the processing unit 150 is such to execute at least part of the method for detecting the presence of substantially monodimensional defects on tyres in a tyre production process according to the embodiments of the invention, as illustrated in the flow diagrams 200, 200-1, 200-2 shown in FIGS. 3A-3G (which will be illustrated more in detail hereinbelow).

For such purpose, the processing unit 150 runs a software program, which comprises one or more software modules which performs the steps of the method for detecting defects on tyres represented by the flow diagram 200 (or 200-1 or 200-2).

It is observed that the preceding considerations relating to the control station 30 can be applied in an analogous manner to the second control station 30-1, with the difference that the sample tyre 103 is green instead of finished. In particular, the second control station 30-1 also comprises an apparatus 100 to detect defects on sample green tyres 103 and said apparatus 100 comprises a respective processing unit 150 such to execute at least part of the method 200, 200-1, 200-2.

Figure 3A:
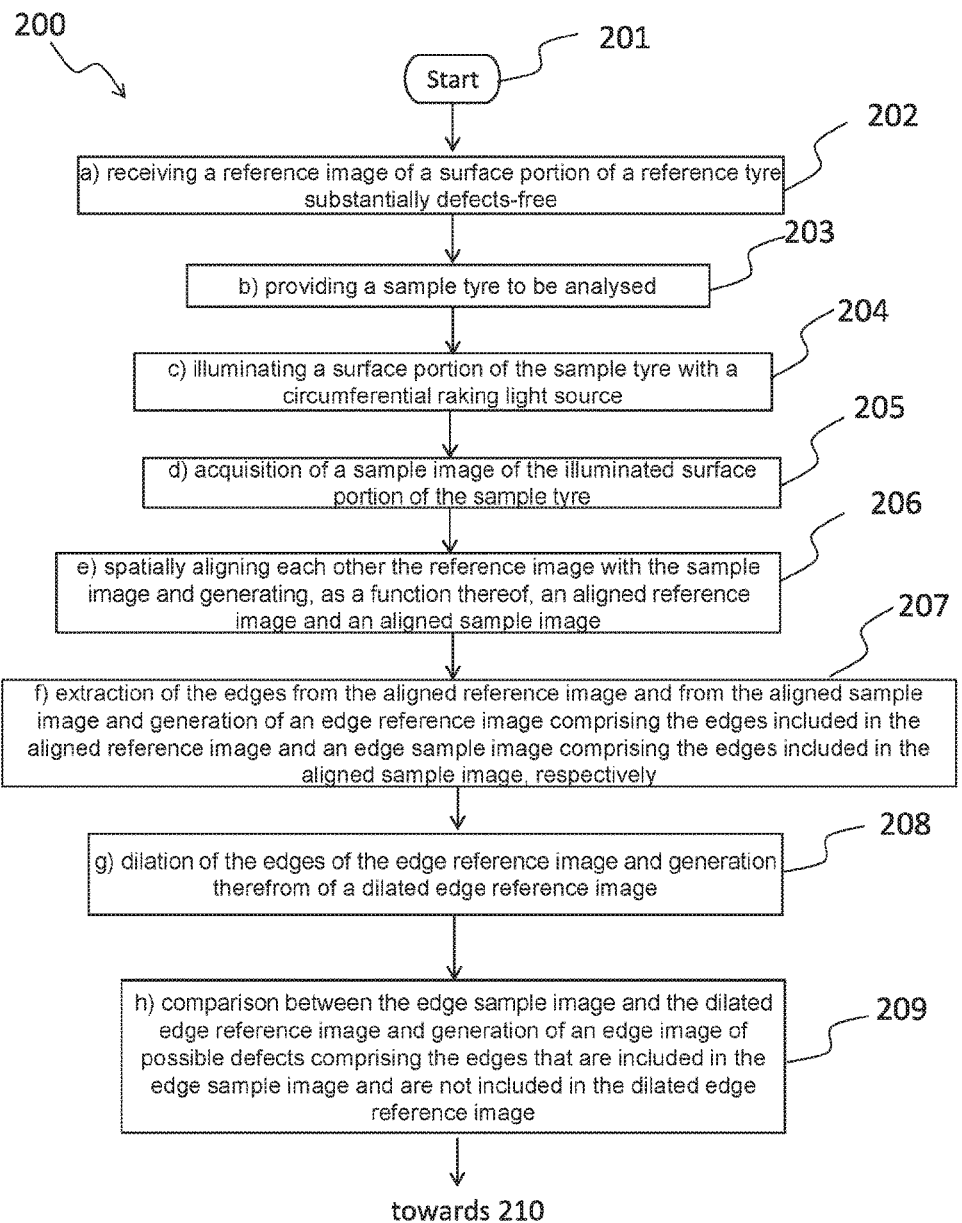
FIGS. 3A-3G show the flow diagrams of the method executed by a processing unit of the apparatus to detect defects on the tyres according to a first, second and third embodiment of the invention.
Figure 3B:
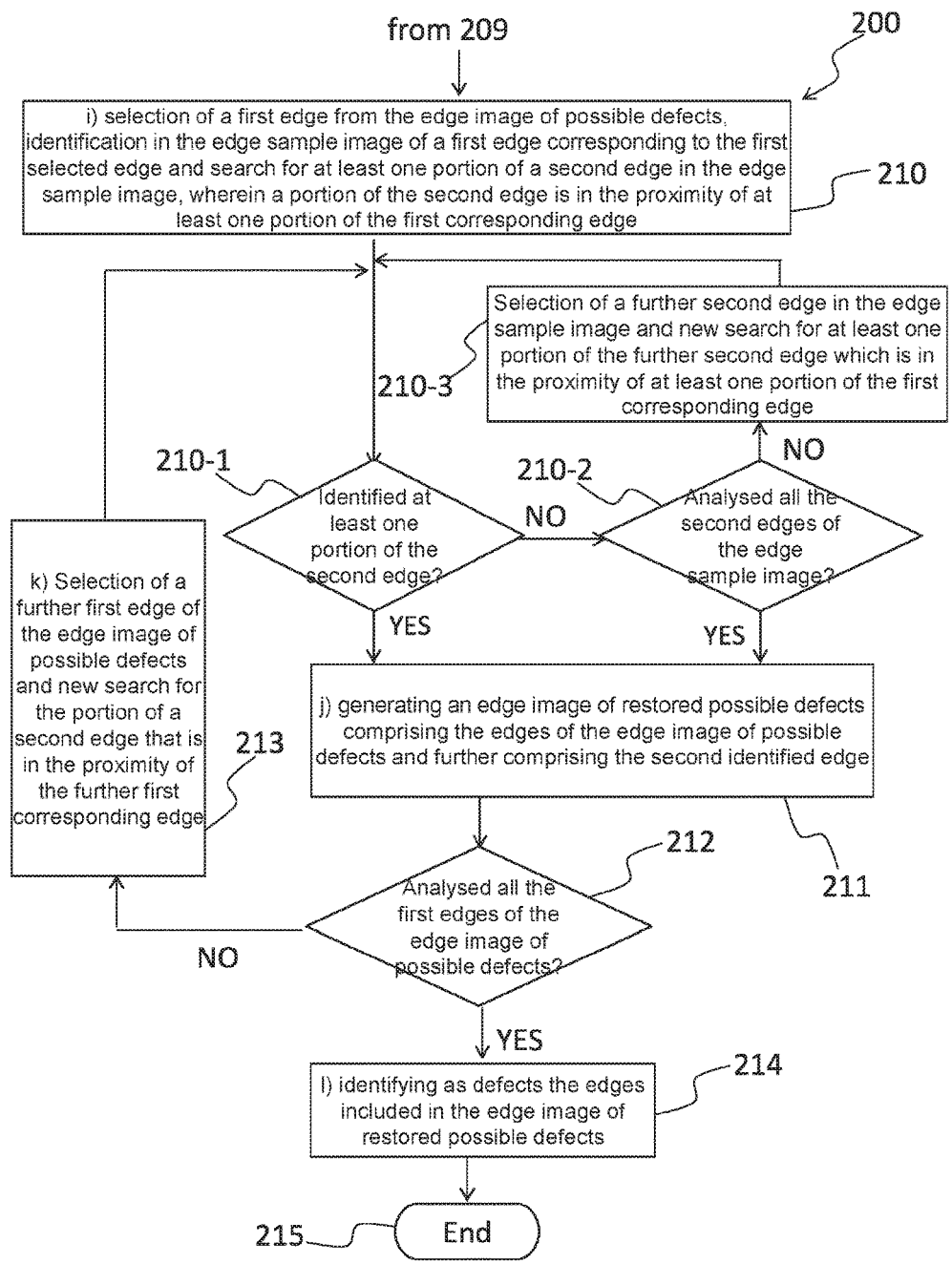

With reference to FIGS. 3A-3B, the flow diagram 200 is shown of the method for detecting substantially monodimensional defects on tyres in a tyre production process according to a first embodiment of the invention. The method for detecting defects is at least partly executed by the processing unit 150 of the apparatus 30, by means of a suitable software program, which comprises one or more software modules that performs the steps of the method for detecting defects on tyres represented by the flow diagram 200.

The flow diagram 200 starts with step 201.

From step 201 it proceeds to step 202 wherein a reference image $I_{ref}$ is received of a surface portion of a reference tyre that is substantially defects-free.

From step 202 it proceeds to step 203 wherein a sample tyre to be analysed is provided.

From step 203 it proceeds to step 204 wherein a surface portion of the sample tyre is illuminated with a raking light source that is preferably circumferential.

From step 204 it proceeds to step 205 wherein a sample image $I_{cmp}$ is acquired of the illuminated surface portion of the sample tyre.

From step 205 it proceeds to step 206 wherein the reference image $I_{ref}$ and the sample image $I_{cmp}$ are typically spatially aligned each other and, as a function thereof, an aligned reference image $I_{ref\_al}$ and an aligned sample image $I_{cmp\_al}$ are generated.

From step 206 it proceeds to step 207 wherein the edges are extracted from the aligned reference image and from the aligned sample image and an edge reference image $I_{ref\_edg}$ comprising the edges included in the aligned reference image $I_{ref\_al}$ and an edge sample image $I_{cmp\_edg}$ comprising the edges included in the aligned sample image $I_{cmp\_al}$ are generated respectively.

From step 207 it proceeds to step 208 wherein a dilation of the edges of the edge reference image $I_{ref\_edg}$ is performed and a dilated edge reference image $I_{ref\_edg\_dl}$ is generated therefrom.

The dilation of the edges of the image can be carried out by marking as edges one or more pixels placed in proximity of such edges, thus obtaining a final pixel number of the dilated edges greater than the number of pixels of the starting edges.

In particular, the dilation of the edges of the image can be carried out by means of the convolution of the image representative of the edges with a predetermined mask that identifies the type and/or size of dilation.

For example, a rectilinear edge represented by three pixels that are close to each other can be dilated into an edge formed by the same three pixels and by further eight pixels adjacent thereto in all directions (three pixels above, three pixels below, one pixel to the right, one pixel to the left). A dilated edge is thus formed by eleven pixels.

The dilation operation has the further advantage of allowing the compensation of imprecisions of the process of alignment between the acquired sample image and the reference image and the compensation of small differences caused for example by the variability between the production moulds, preventing the generation of edges which can be interpreted as false indications of defects.

From step 208 it proceeds to step 209 wherein a comparison is carried out between the edge sample image $I_{cmp\_edg}$ and the dilated edge reference image $I_{ref\_edg\_dl}$ and an edge image of possible defects $I_{edg\_pd}$ is generated comprising the edges that are included in the edge sample image $I_{cmp\_edg}$ and are not included in the dilated edge reference image $I_{ref\_edg\_dl}$.

It is observed that the use of the term "possible" in the "edge image of possible defects $I_{edg\_pd}$" means that the edges included therein potentially belong to a substantially monodimensional defect (e.g. a cut), but have not yet actually been identified as defects (in particular, cuts), because a further processing is necessary so that they can actually be confirmed as defects (in particular, cuts).

From step 209 it proceeds to step 210 wherein a first edge is selected from the edge image of possible defects $I_{edg\_pd}$, a first edge is identified in the edge sample image $I_{cmp\_edg}$ corresponding to the first selected edge and at least one portion of a second edge in the edge sample image $I_{cmp\_edg}$ is searched for, wherein a portion of the second edge is in the proximity of at least one portion of the first corresponding edge.

Preferably, the proximity between the first corresponding edge and the second edge is calculated in the following manner:
- a plurality of distances is measured by means of measuring the distance between each pixel belonging to the first corresponding edge and each pixel belonging to the second edge;
- the minimum distance is identified between the plurality of measured distances;
- it is verified that the minimum distance is less than or equal to the value of a distance threshold.

The distance D(p,q) between a pixel p of the first corresponding edge having coordinates $(x_p, y_p)$ and a pixel q of the second edge having coordinates $(x_q, y_q)$ is calculated, for example, with the following Euclidean distance:

$$D(p,q)=[(x_p-x_q)^2+(y_p-y_q)^2]^{1/2}.$$

Alternatively, the distance D(p,q) between the pixel p and q can be calculated with the following formula:

$$D(p,q)=|x_p-x_q|+|y_p-y_q|,$$

in which | | represents the absolute value function.

From step 210 it proceeds to step 210-1 wherein it is verified if at least one portion of the second edge of the edge sample image $I_{cmp\_edg}$ has been identified which is in the proximity of at least one portion of the first corresponding edge in the edge sample image $I_{cmp\_edg}$:

in the affirmative case (i.e. at least one portion of the second edge has been identified), it proceeds to step 211;

in the negative case (i.e. at least one portion of the second edge has not been identified), it proceeds to step 210-2.

In step 210-2 it is verified if all the second edges of the edge sample image $I_{cmp\_edg}$ have been analysed:

in the affirmative case (i.e. all the second edges of the edge sample image $I_{cmp\_edg}$ have been analysed), it proceeds to step 211;

in the negative case (i.e. all the second edges of the edge sample image $I_{cmp\_edg}$ have not been analysed), it proceeds to step 210-3.

In step 210-3 a further second edge is selected from the edge sample image $I_{cmp\_edg}$ and (analogous to step 210) a new search is carried out for at least one portion of the further second edge which is in the proximity of at least one portion of the first corresponding edge.

From step 210-3, it returns to step 210-1.

Therefore the cycle composed of the steps 210-1, 210-2, 210-3 is repeated until at least one portion of a second edge of the edge sample image $I_{cmp\_edg}$ is identified which is in the proximity of at least one portion of the first corresponding edge, or is repeated until all the second edges of the edge sample image $I_{cmp\_edg}$ have been analysed:

when the cycle terminates in the first case, it means that an edge has been found (in the edge sample image $I_{cmp\_edg}$) which is representative of a cut and that said found edge had been partially eliminated from the dilation and comparison operation, and hence it must be restored with its entire length (see the subsequent step 211);

when the cycle terminates in the second case, it means that no edge has been found (in the edge sample image $I_{cmp\_edg}$) that must be restored, hence the first edge from the edge image of possible defects $I_{edg\_pd}$ represents the entire length of the defect (e.g. a cut).

In step 211, an edge image of restored possible defects $I_{edg\_pd-r}$ is generated, comprising the edges of the edge image of possible defects $I_{edg\_pd}$ and further comprising the second identified edge.

In other words, in the edge image of possible defects $I_{edg\_pd}$, an edge has been added which replaces the first edge, wherein the added edge has a length greater than the first edge.

From step 211 it proceeds to step 212 wherein it is verified if all the first edges of the edge image of possible defects $I_{edg\_pd}$ have been analysed:

in negative case, it proceeds to step 213;

in positive case, it proceeds to step 214.

In step 213 a further first edge is selected from the edge image of possible defects $I_{edg\_pd}$ and (analogous to step 210) a new search is carried out for a portion of a second edge which is found in the proximity of the further first corresponding edge.

From step 213, it returns to step 210-1.

Therefore the cycle composed of the steps 210, 210-1, 211, 212, 213 is repeated until all the first edges of the edge image of possible defects $I_{edg\_pd}$ have been analysed.

In step 214, the edges included in the edge image of restored possible defects $I_{edg\_pd-r}$ are identified as defects.

Preferably, the flow diagram 200 further comprises, after step 214, the step of generating a graphical or textual representation of the edges identified as defects.

Figure 4A:
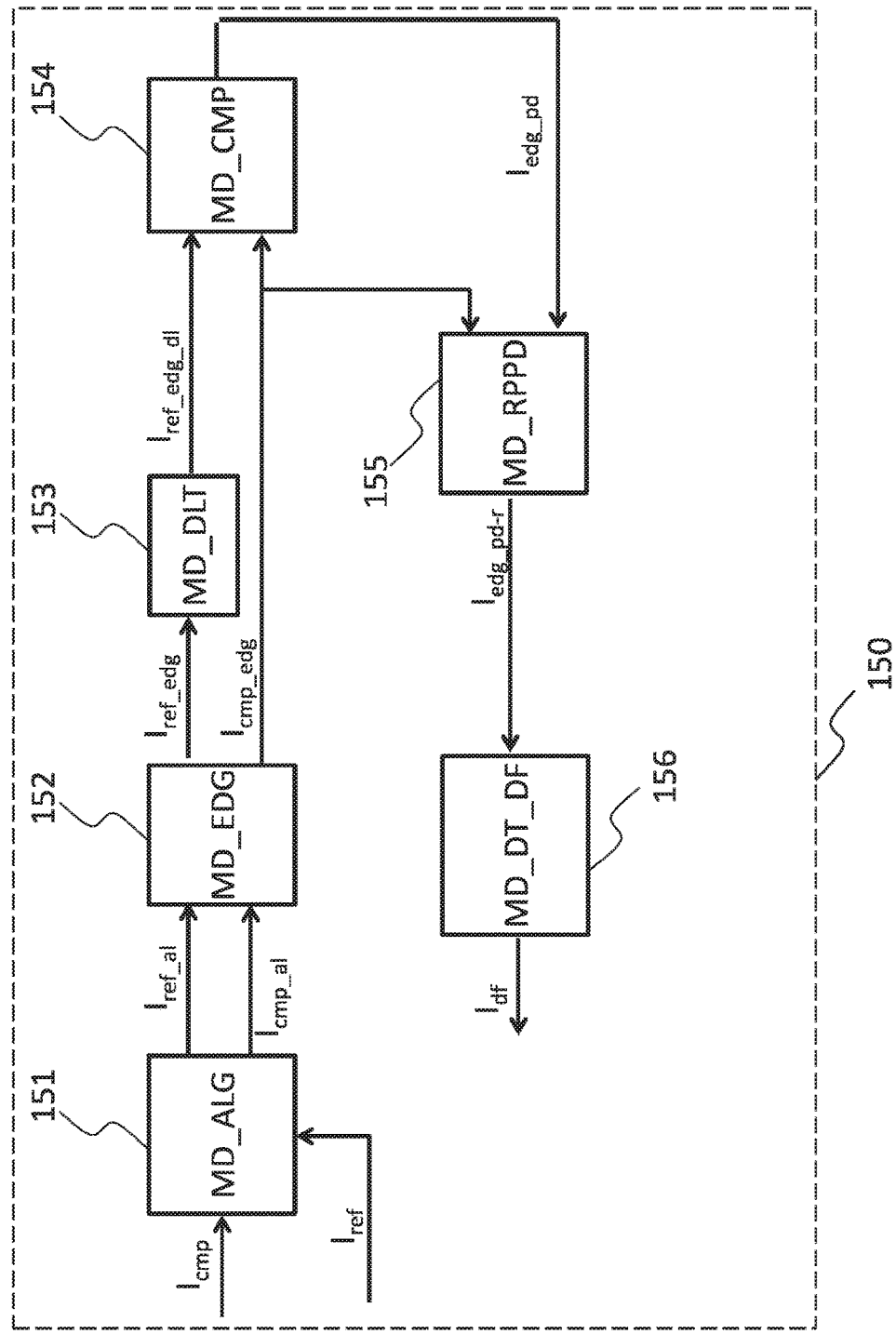
FIGS. 4A-4C show more in detail the processing unit of the apparatus to detect defects on the tyres according to the first, second and third embodiment of the invention.

With reference to FIG. 4A, the processing unit 150 according to a first embodiment of the invention is shown more in detail. The processing unit 150 comprises:

an alignment module 151;

an edge extraction module 152;

an edge dilation module 153;

a comparison module 154;

a restoration module 155;

a defect detection module 156.

The alignment module 151 is configured to receive the sample image $I_{cmp}$ (acquired from the camera 141) of a surface portion of the sample tyre 103 and to receive the reference image $I_{ref}$ of a surface portion of the reference tyre, it is configured to spatially align each other the reference image $I_{ref}$ with the sample image $I_{cmp}$ and it is configured to generate, as a function of said images, an aligned reference image $I_{ref\_al}$ and an aligned sample image $I_{cmp\_al}$.

Said spatial alignment can be obtained in different ways:

the reference image $I_{ref}$ is maintained fixed and the sample image $I_{cmp}$ is moved, in a manner so as to spatially align the sample image $I_{cmp}$ with the reference image $I_{ref}$: in this case the reference image $I_{ref}$ remains unchanged (i.e. the aligned reference image $I_{ref\_al}$ is equal to the reference image $I_{ref}$) and it is generated the aligned sample image $I_{cmp\_al}$ obtained from the sample image $I_{cmp}$ by means of said movement;

the sample image $I_{cmp}$ is maintained fixed and the reference image $I_{ref}$ is moved, in a manner so as to spatially align the reference image $I_{ref}$ with the sample image $I_{cmp}$: in this case the sample image $I_{cmp}$ remains unchanged (i.e. the aligned sample image $I_{cmp\_al}$ is equal to the sample image $I_{cmp}$) and it is generated the aligned reference image $I_{ref\_al}$ obtained from the reference image $I_{ref}$ by means of said movement;

both the reference image $I_{ref}$ and the sample image $I_{cmp}$ are moved, in a manner so as to be aligned with each other: in this case it is generated an aligned reference image $I_{ref\_al}$ obtained from the reference image $I_{ref}$ by means of a first movement of the reference image $I_{ref}$ and it is generated an aligned sample image $I_{cmp\_al}$ obtained from the sample image $I_{cmp}$ by means of a second movement of the sample image $I_{cmp}$.

The edge extraction module 152 is configured to extract the edges from the aligned reference image and from the aligned sample image $I_{cmp\_al}$ and to generate an edge reference image $I_{ref\_edg}$ comprising the edges included in the aligned reference image and an edge sample image $I_{cmp\_edg}$ comprising the edges included in the aligned sample image $I_{cmp\_al}$, respectively.

Figure 6B:
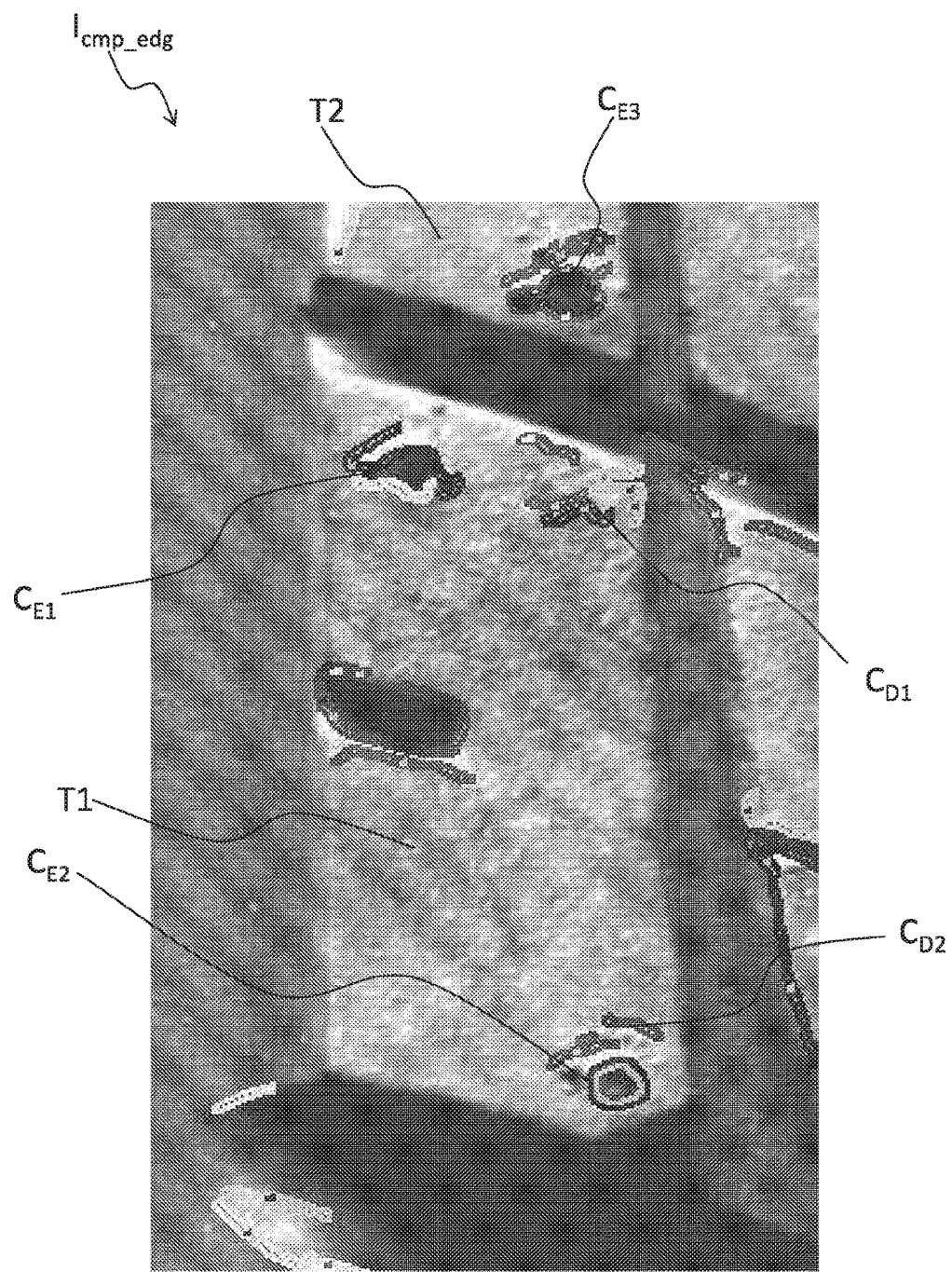

FIG. 6B shows an example of an edge sample image $I_{cmp\_edg}$ superimposed on the aligned sample image $I_{cmp\_al}$ in grey scale, wherein the latter has been obtained from the acquired sample image $I_{cmp}$ of FIG. 6A.

Figure 6C:
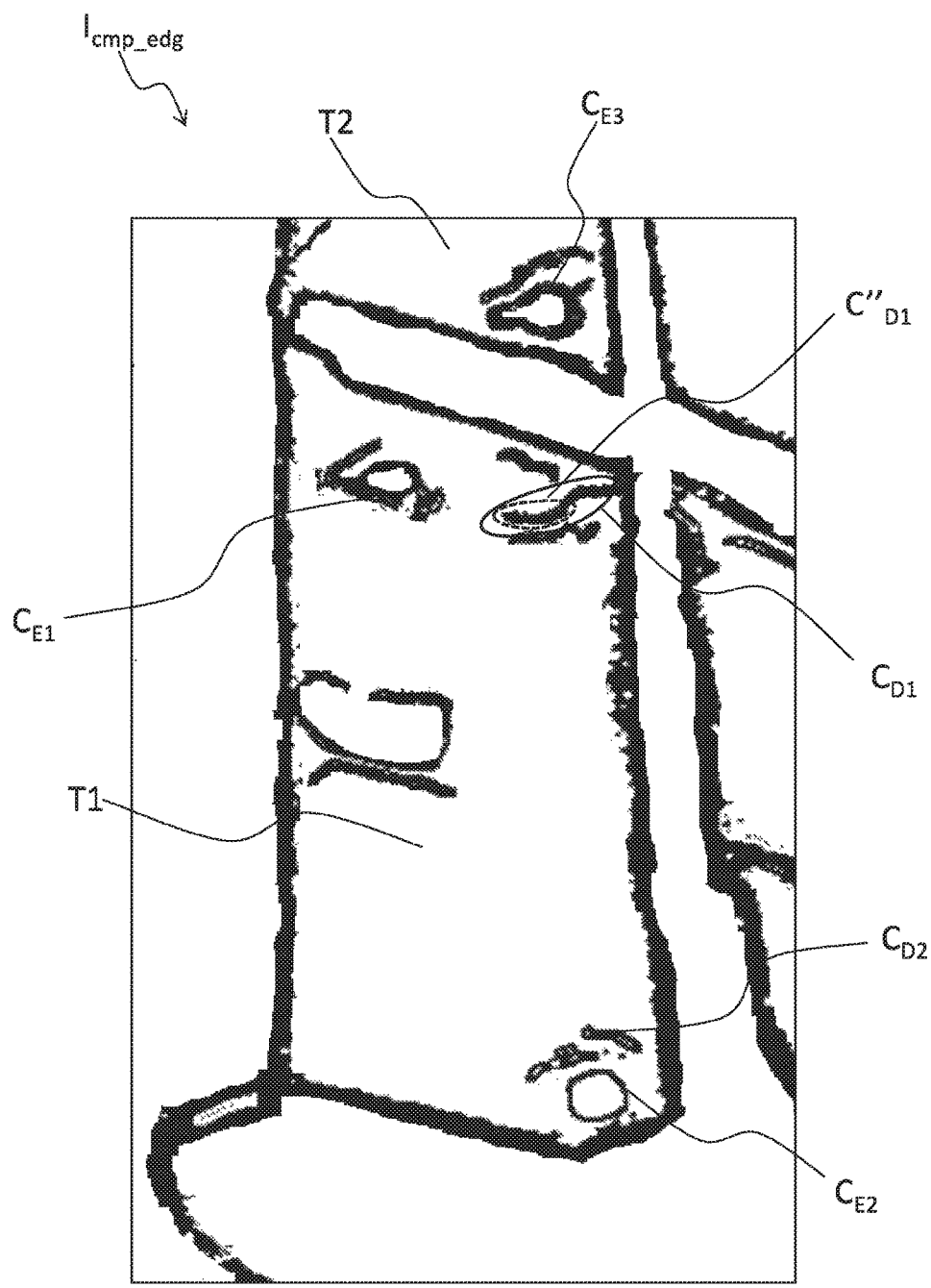

FIG. 6C shows the same example of an edge sample image $I_{cmp\_edg}$ of FIG. 6B, wherein the superimposition is not present and hence it is possible to better observe the presence of the edges of the edge sample image $I_{cmp\_edg}$.

It is possible to observe that the following are present on the block T1:

an edge $C_{D1}$ with the form of a line composed of curvilinear sections (see the continuous circled line), wherein the edge $C_{D1}$ has been obtained from the first cut D1 by means of the operation of edge extraction from the aligned sample image $I_{cmp\_al}$;

an edge $C_{D2}$ with the form of a line composed of curvilinear sections, wherein the edge $C_{D2}$ has been obtained from the second cut D2 by means of the operation of edge extraction from the aligned sample image $I_{cmp\_al}$;

an edge with circular form $C_{E1}$ obtained from the non-defective element E1 with circular form by means of the operation of edge extraction from the aligned sample image $I_{cmp\_al}$;

an edge with circular form $C_{E2}$ obtained from the non-defective element E2 with circular form by means of the operation of edge extraction from the aligned sample image $I_{cmp\_al}$.

It is also possible to observe that, on block T2, an edge with circular form $C_{E3}$ is present, obtained from the non-defective element E3 with circular form.

It is observed that the edge sample image $I_{cmp\_edg}$ comprises the edges $C_{D1}$, $C_{D2}$, $C_D$, $C_{E2}$, $C_{E3}$, which are indicative both of the edges of possible cuts present on the analysed surface portion of the sample tyre 103, and of edges of non-defective elements present on the same analysed surface portion of the sample tyre 103.

The extraction of the edges can for example be carried out by using derivative filters, wherein the value of each point represents a numeric estimate of the gradient in the corresponding pixel of the image, wherein the gradient is the vector whose components are the partial derivative in the two different directions.

The calculation of the gradient can be carried out, for example, by means of the Roberts, Prewitt or Sobel operators.

The edge dilation module 153 is configured to carry out a dilation of the edges of the edge reference image $I_{ref\_edg}$ and to generate therefrom a dilated edge reference image $I_{ref\_edg\_dl}$.

The comparison module 154 is configured to compare the edges of the edge sample image $I_{cmp\_edg}$ with the edges of the dilated edge reference image $I_{ref\_edg\_dl}$ and to generate an edge image of possible defects $I_{edg\_pd}$ comprising the edges that are included in the edge sample image $I_{cmp\_edg}$ and are not included in the dilated edge reference image $I_{ref\_edg\_dl}$: the edges included in the edge sample image $I_{cmp\_edg}$ are suspect, i.e. they must be analysed more in detail in order to verify if they belong to defects.

In other words, the comparison module 154 is such to analyse the edges included in the edge sample image $I_{cmp\_edg}$, is such to analyse the edges included in the dilated edge reference image $I_{ref\_edg\_dl}$, is such to identify the edges that are included in the edge sample image $I_{cmp\_edg}$ and are not included in the dilated edge reference image $I_{ref\_edg\_dl}$: said identified edges constitute the edge image of possible defects $I_{edg\_pd}$.

Preferably, the identification of the edges is obtained by means of an operation of subtraction between the edges of the edge sample image $I_{cmp\_edg}$ and the edges of the dilated edge reference image $I_{ref\_edg\_dl}$.

Figure 6D:
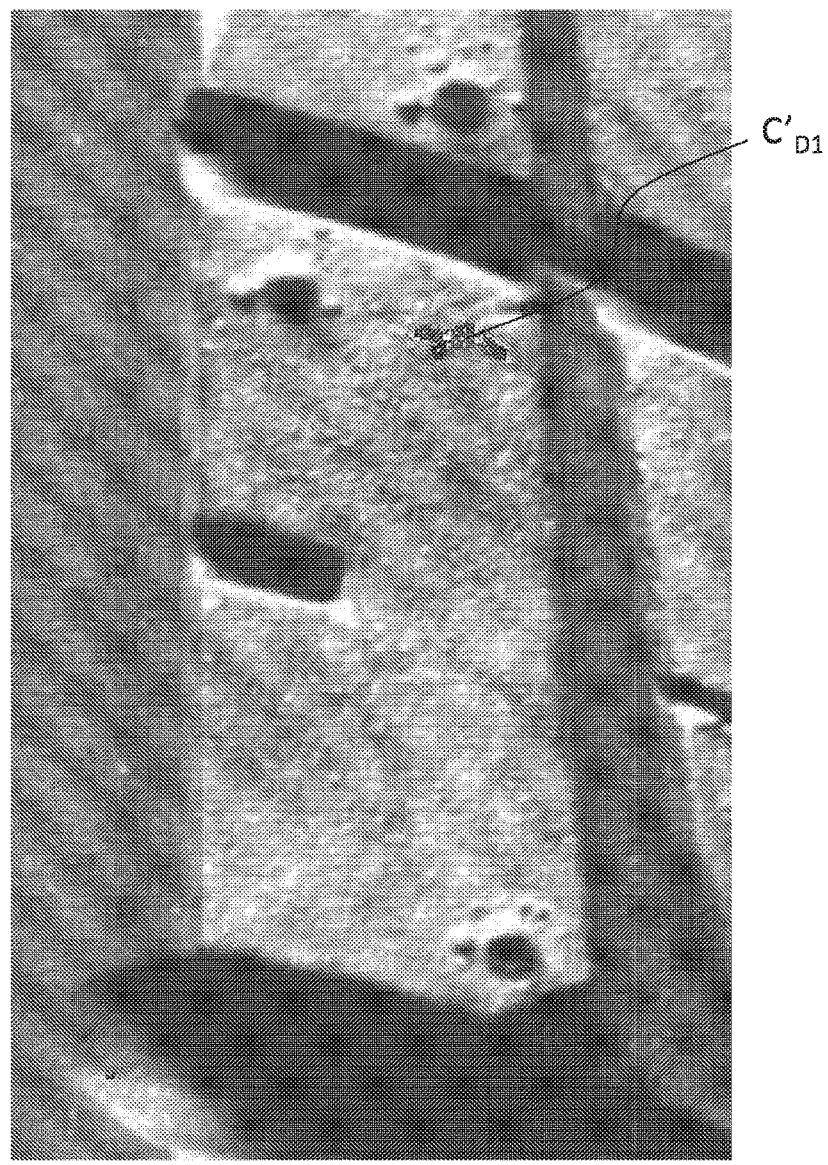

FIG. 6D shows an example of an edge image of possible defects $I_{edg\_pd}$ obtained from the comparison between the edge sample image $I_{cmp\_edg}$ of FIGS. 6B-6C and a dilated edge reference image $I_{ref\_edg\_dl}$ of an analogous portion of the reference tyre, wherein the edge image of possible defects $I_{edg\_pd}$ is superimposed on the aligned sample image $I_{cmp\_al}$.

Figure 6E:
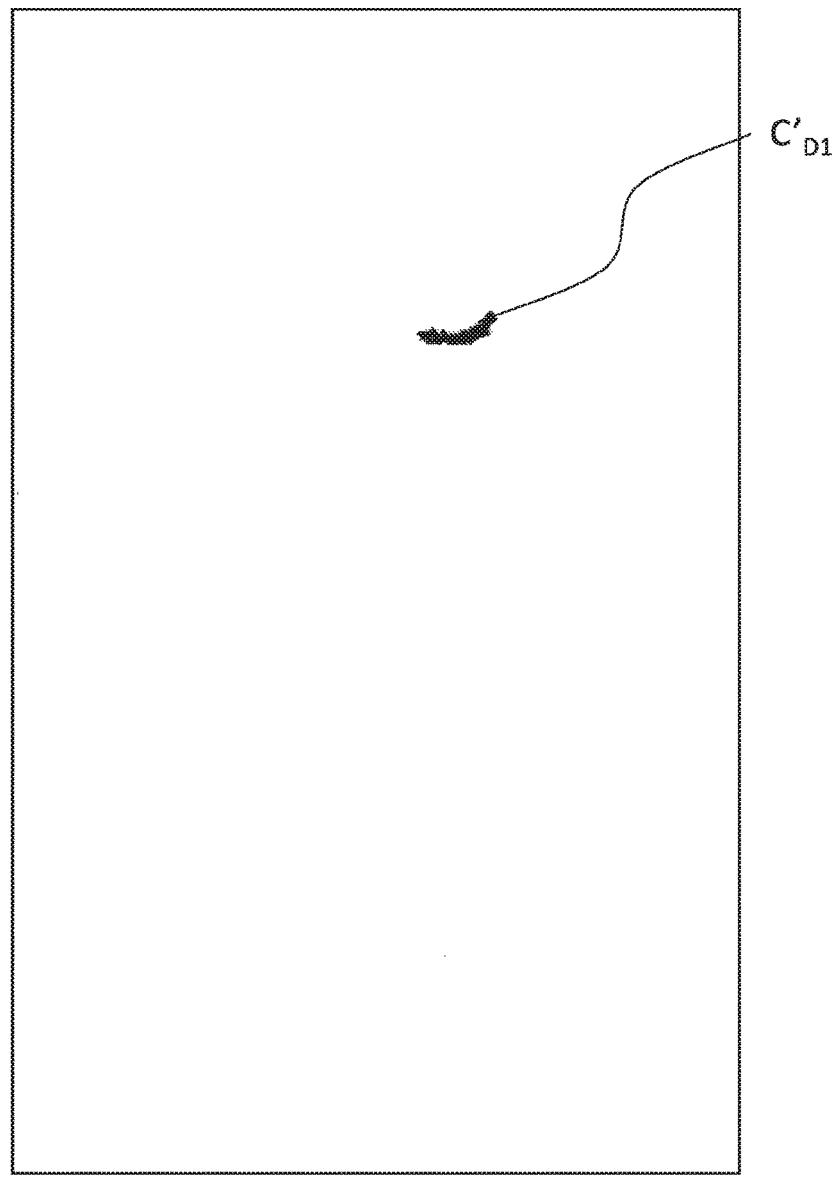

FIG. 6E shows the same example of an edge image of possible defects $I_{edg\_pd}$ of FIG. 6D, wherein the superimposition is not present and thus it is possible to better observe the presence of the edges of the edge image of possible defects $I_{edg\_pd}$.

It is possible to observe that the FIGS. 6D-6E contain a lower number of edges than those of FIGS. 6B-6C; in other words, only some of the edges of the edge sample image $I_{cmp\_edg}$ were identified as possible defects.

In particular, FIGS. 6D-6E show that:

the edges with circular form $C_{E1}$, $C_{E2}$, $C_{E3}$ of the non-defective elements E1, E2, E3 of circular form are no longer present;

the edge $C_{D2}$ of the cut D2 is no longer present;

a part $C'_{D1}$ of the edge $C_{D1}$ of the cut D1 is still present.

In other words, the edge $C_{D1}$ of the cut D1 has been divided into two portions by the dilation and comparison operation, wherein a first portion $C'_{D1}$ is survived to the dilation and comparison operation (and thus it is included in the edge image of possible defects $I_{edg\_pd}$), while a second portion was absorbed by the dilation and comparison operation (and thus it is not included in the edge image of possible defects $I_{edg\_pd}$).

It is possible to observe that the length of the edge $C'_{D1}$ is smaller than the length of the edge $C_{D1}$.

The reason why in the edge image of possible defects $I_{edg\_pd}$ a portion $C'_{D1}$ of the edge $C_{D1}$ is present is that the cut D1 has a length and a width that are sufficiently large; differently, the edge $C_{D2}$ of the cut D2 is not present in the edge image of possible defects $I_{edg\_pd}$ because the cut D2 has small size.

The restoration module 155 has the function of restoring the defects that were partially eliminated from the dilation and comparison operation, such as for example the cuts that are found very close to the edges of a block of the tread.

In other words, the dilation and comparison operations described above are such to divide an edge representative of a defect (e.g. a cut) into two close sub-edges of smaller size, thus causing an artefact in the edge image of possible defects $I_{edg\_pd}$.

In particular, the restoration module 155 is configured to select a first edge $C'_{D1}$ from the edge image of possible defects $I_{edg\_pd}$, to identify in the edge sample image $I_{cmp\_edg}$ a first edge $C''_{D1}$ (see in FIG. 6C the circled dashed line) corresponding to the first selected edge $C'_{D1}$ and to verify the presence of at least one portion of a second edge $C_{D1}$ in the edge sample image $I_{cmp\_edg}$, wherein a portion of the second edge $C_{D1}$ is in the proximity of at least one portion of the first corresponding edge $C''_{D1}$.

Moreover, the restoration module 155 is configured to generate an edge image of restored possible defects $I_{edg\_pd\text{-}r}$ comprising the edges of the edge image of possible defects and further comprising the second identified edge $C_{D1}$.

Moreover, the restoration module 155 is configured to repeat said selection of the first edge and said identification for further first edges of the edge image of possible defects $I_{edg\_pd}$.

Figure 6F:
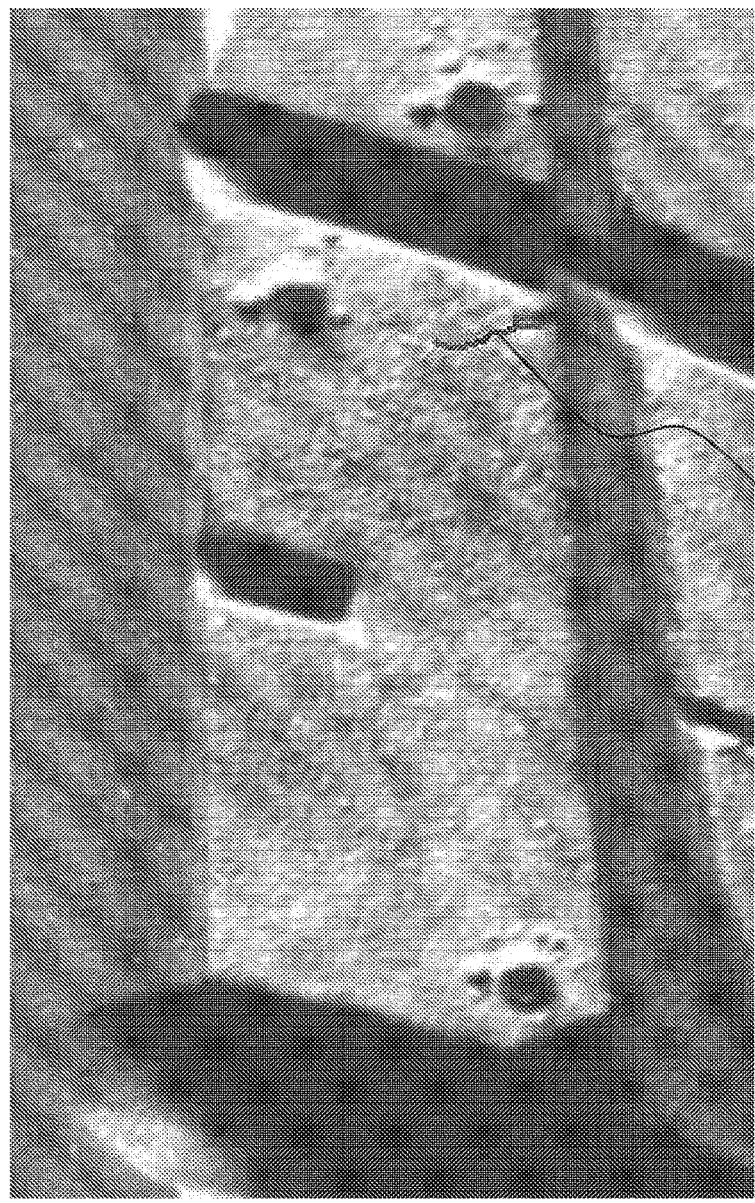
Figure 6G:
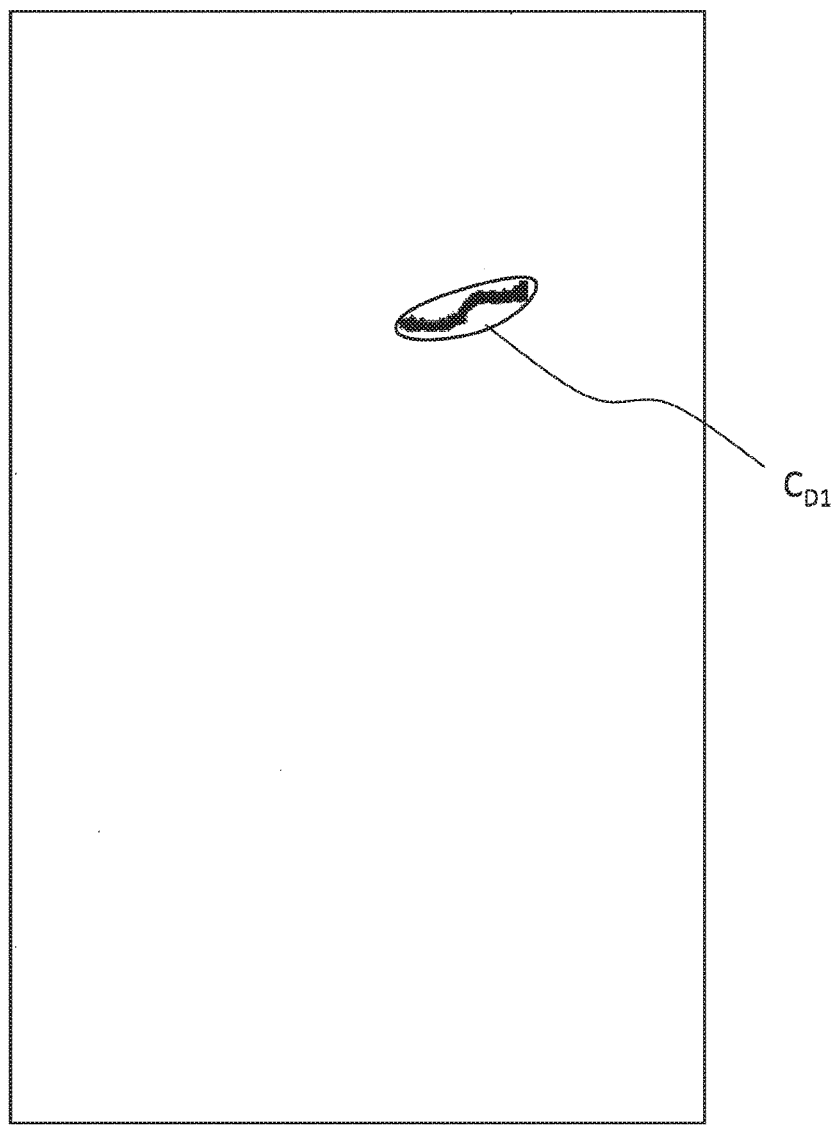

FIG. 6F shows an example of an edge image of restored possible defects $I_{edg\_pd\text{-}r}$ superimposed on the aligned sample image $I_{cmp\_al}$; FIG. 6G shows the same example of edge image of restored possible defects $I_{edg\_pd\text{-}r}$ of FIG. 6F, wherein no superimposition is present and thus it is possible to better observe the presence of the edges of the edge image of restored possible defects $I_{edg\_pd\text{-}r}$.

It is possible to observe in FIGS. 6F-6G that the edge $C_{D1}$ of the defect D1 was restored, because the restoration module 155 has identified that in the edge sample image $I_{cmp\_edg}$ the edge $C_{D1}$ is present (see once again FIGS. 6B-6C), which is sufficiently close to the edge $C''_{D1}$ of the edge sample image $I_{cmp\_edg\_pd}$ (see once again FIGS. 6B-CE).

Therefore the restoration module 155 has restored the presence of the edge $C_{D1}$ (and hence of the cut D1) in its entire length, i.e. it has joined in a single edge $C_{D1}$ the two sub-edges that were previously generated by the dilation and comparison operations.

Preferably, for each edge of the edge sample image $I_{cmp\_edg}$ an orientation is associated which is defined as the direction perpendicular to the average direction of the considered edge. In this case, the restoration module 155 is configured to verify (in addition to the proximity between the first corresponding edge and the second selected edge) if the orientation of a first corresponding edge $C''_{D1}$ in the edge sample image $I_{cmp\_edg}$ is substantially equal to the orientation of a second edge $C_{D1}$ selected from the edge sample image $I_{cmp\_edg}$: in the affirmative case, the first corresponding edge $C''_{D1}$ is substituted by the second edge $C_{D1}$, otherwise the two edges remain separated.

For the sake of simplicity, it is observed that an example has been considered wherein only one cut D1 is present having a non-negligible length and thus the operations allowing to identify the presence of the cut D1 in its entire length have been previously explained.

The preceding considerations are applicable in analogous manner if two or more cuts are present having a non-negligible length. For example, if the second cut D2 has (differently from that indicated above) a non-negligible length, the edge image of possible defects $I_{edg\_pd}$ includes (in addition to the edge $C'_{D1}$ representative of a portion of the first cut D1) a further edge $C'_{D2}$ representative of a portion of the second cut D2, thus the edge image of restored possible defects $I_{edg\_pd-r}$ includes (in addition to the edge $C_{D1}$ representative of the entire length of the first cut D1) a further edge $C_{D2}$ representative of the entire length of the second cut D2.

The defect detection module 156 is configured to identify as defects the edges included in the edge image of restored possible defects $I_{edg\_pd-r}$.

Preferably, the defect detection module 156 is further configured to generate a defect signal $I_{df}$ representative of the edges identified as defects (i.e. the edges included in the edge image of restored possible defects $I_{edg\_pd-r}$).

With reference to FIGS. 6F-6G, the defect detection module 156 identifies the presence of the defect D1 by means of the presence of the edge $C_{D1}$ in the edge image of restored possible defects $I_{edg\_pd-r}$.

Preferably, the edge image of restored possible defects $I_{edg\_pd-r}$ (possibly superimposed on the aligned sample image $I_{cmp\_al}$) is displayed on a screen present in the production line 1 (for example the screen is connected to the control station 30 or it is part of the apparatus 100 within the control station 30): in this manner, a human operator assigned for the quality control can immediately see the presence and the position of the defect (in particular, of the cut D1) on the sample tyre. The image displayed on the screen can contain a square which encloses the area wherein the defect was detected, so as to further facilitate the identification of the position of the defect.

Alternatively, the edge image of restored possible defects $I_{edg\_pd-r}$ is converted into a text file that contains the indication of the presence of the defect D1, of its position and length.

Figure 3C:
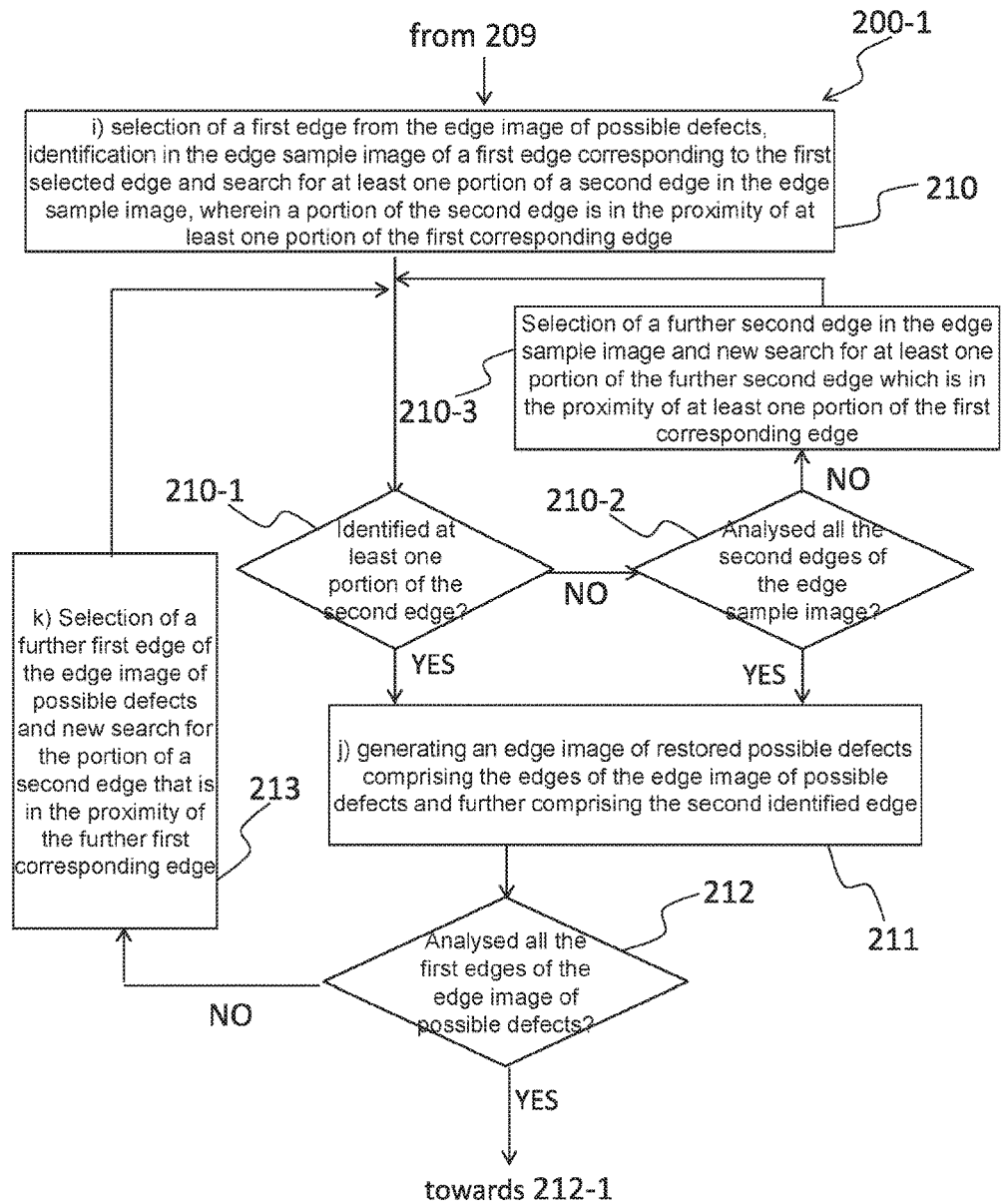
Figure 3D:
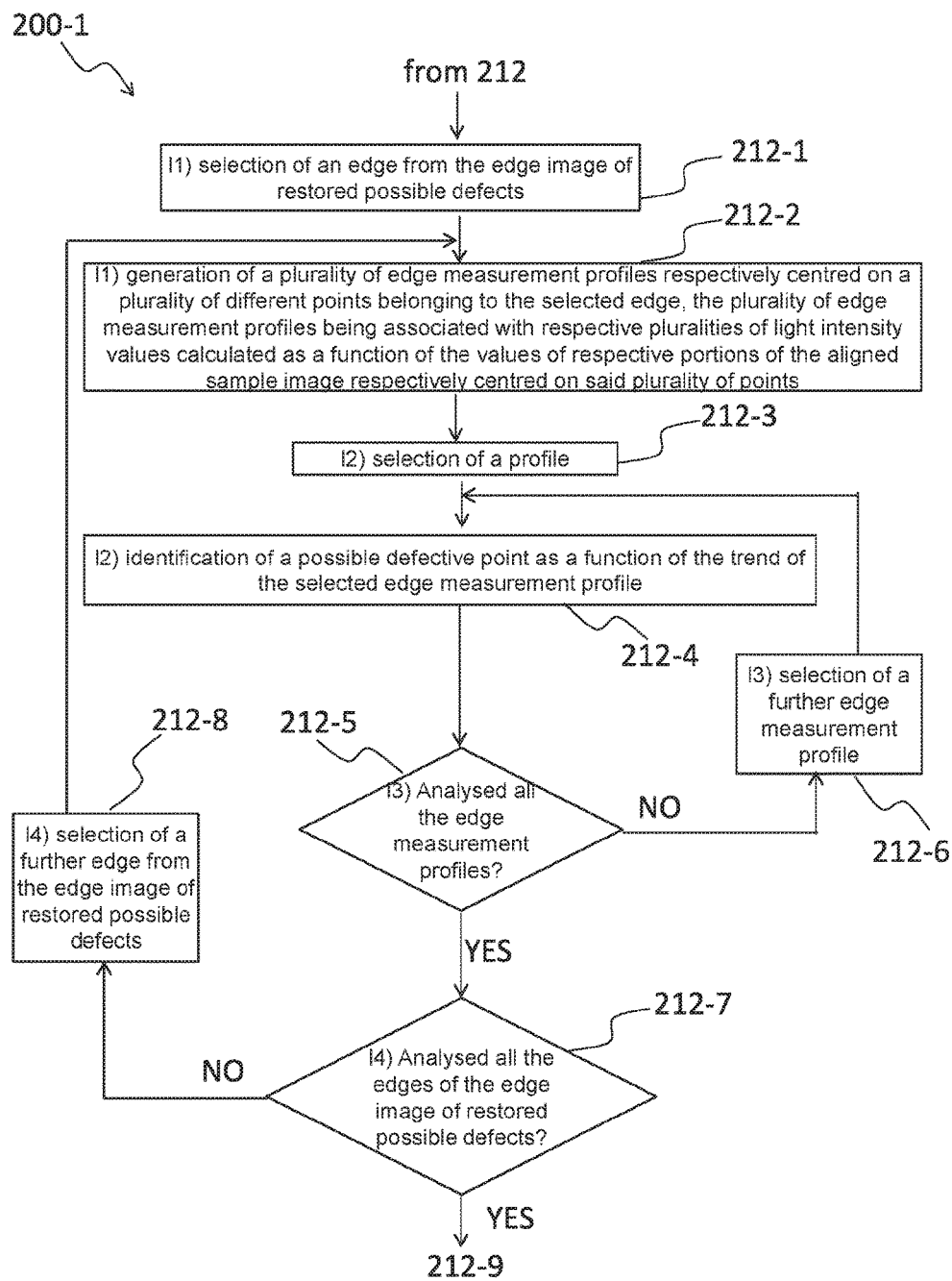
Figure 3E:
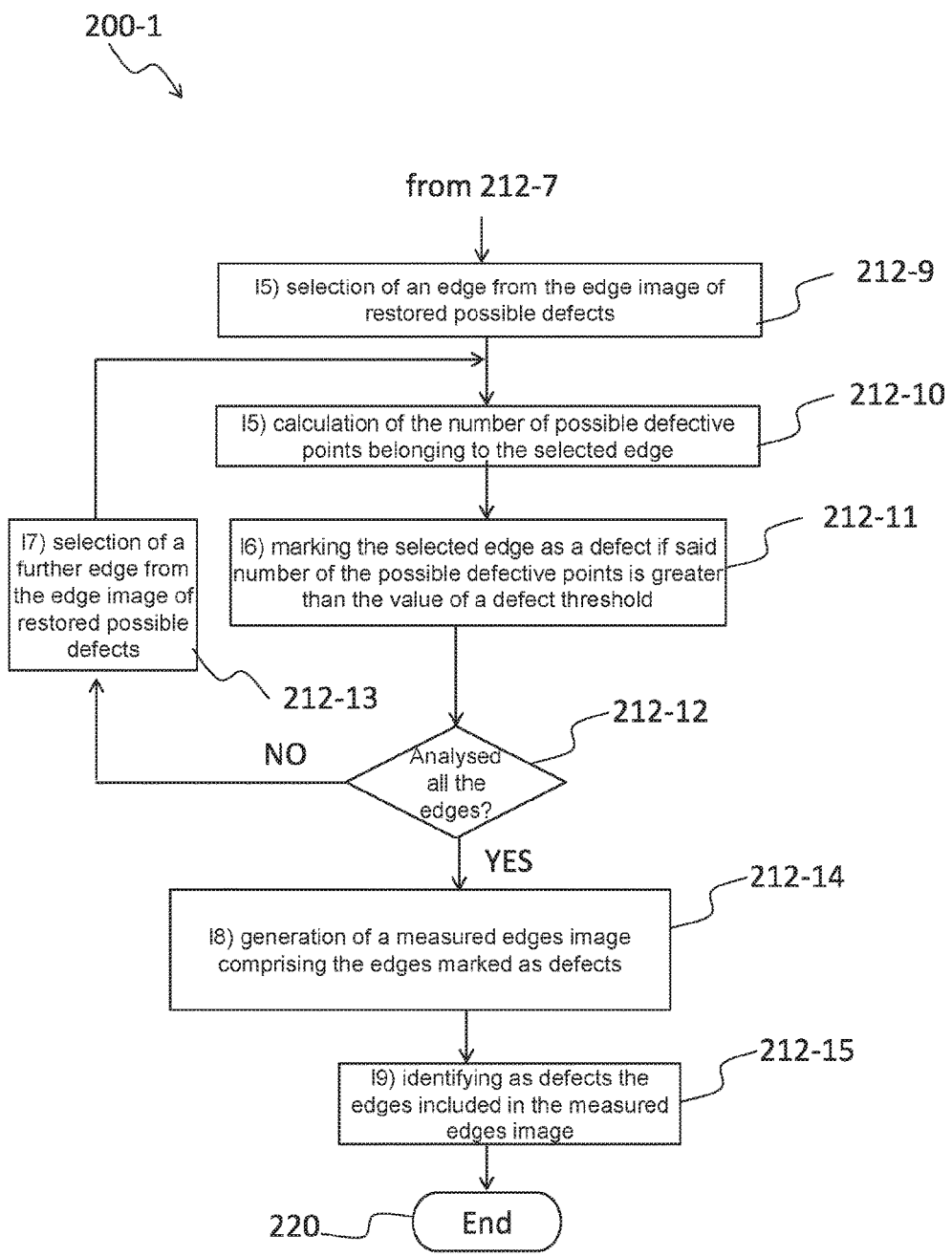

With reference to FIGS. 3C-3E, the flow diagram 200-1 is shown of a part of the method for detecting defects on tyres in a tyre production process according to a second embodiment of the invention.

The flow diagram 200-1 differs from the flow diagram 200 of the first embodiment for the presence of the further steps 212-1, 212-2, . . . 212-15 in place of step 214.

Therefore the flow diagram 200-1 of the second embodiment is composed of the set of FIGS. 3A, 3C, 3D, 3E.

From step 212 it continues to step 212-1 wherein an edge is selected from the edge image of restored possible defects $I_{edg\_pd-r}$.

From step 212-1 it continues to step 212-2 wherein a plurality of edge measurement profiles are generated, respectively centred on a plurality of different points belonging to the selected edge, the plurality of edge measurement profiles being associated with respective pluralities of light intensity values calculated as a function of the values of respective portions of the aligned sample image $I_{cmp\_al}$ respectively centred on said plurality of points.

From step 212-2 it continues to step 212-3 wherein an edge measurement profile is selected from the plurality of edge measurement profiles.

From step 212-3 it continues to step 212-4 wherein a possible defective point is identified as a function of the trend of the selected edge measurement profile.

From step 212-4 it continues to step 212-5 wherein it is verified if all the edge measurement profiles have been analysed:
in affirmative case, it continues to step 212-7;
in negative case, it continues to step 212-6.

In step 212-6, a further edge measurement profile is selected, then it returns to step 212-4.

Therefore the cycle composed of steps 212-4, 212-5, 212-6 is repeated until all the edge measurement profiles of the selected edge of the edge image of restored possible defects $I_{edg\_pd-r}$ have been analysed.

In step 212-7 it is verified if all the edges of the edge image of restored possible defects have been analysed:
in affirmative case, it continues to step 212-9;
in negative case, it continues to step 212-8.

In step 212-8, a further edge is selected from the edge image of restored possible defects $I_{edg\_pd-r}$, then it returns to step 212-2.

Therefore the cycle composed of steps 212-2, 212-3, 212-4, 212-5, 212-7, 212-8 is repeated until all the edges of the edge image of restored possible defects $I_{edg\_pd-r}$ have been analysed.

In step 212-9, an edge is selected from the edge image of restored possible defects $I_{edg\_pd-r}$.

From step 212-9 it proceeds to step 212-10 wherein the number of the possible defective points belonging to the selected edge is calculated.

From step 212-10 it proceeds to step 212-11 wherein the selected edge is marked as a defect if said calculated number of the possible defective points is greater than the value of a defect threshold.

From step 212-11 it proceeds to step 212-12 wherein it is verified if all the edges of the edge image of restored possible defects $I_{edg\_pd-r}$ have been analysed:
in affirmative case, it proceeds to step 212-14;
in negative case, it proceeds to step 212-13.

In step 212-13, a further edge is selected from the edge image of restored possible defects $I_{edg\_pd-r}$, then it returns to step 212-10.

Therefore the cycle composed of steps 212-10, 212-11, 212-12, 212-13 is repeated until all the edges of the edge image of restored possible defects $I_{edg\_pd-r}$ have been analysed.

In step 212-14, a measured edges image $I_{ms\_edg}$ generated comprising the edges marked as defects.

From step 212-14, it continues to step 212-15 wherein the edges included in the measured edges image $I_{ms\_edg}$ are identified as defects.

From step 212-15 it proceeds to step 220 wherein the flow diagram 200-1 terminates.

Preferably, the flow diagram 200-1 further comprises, after step 212-15, the step of generating a graphical or textual representation of the edges marked as defects.

Figure 4B:
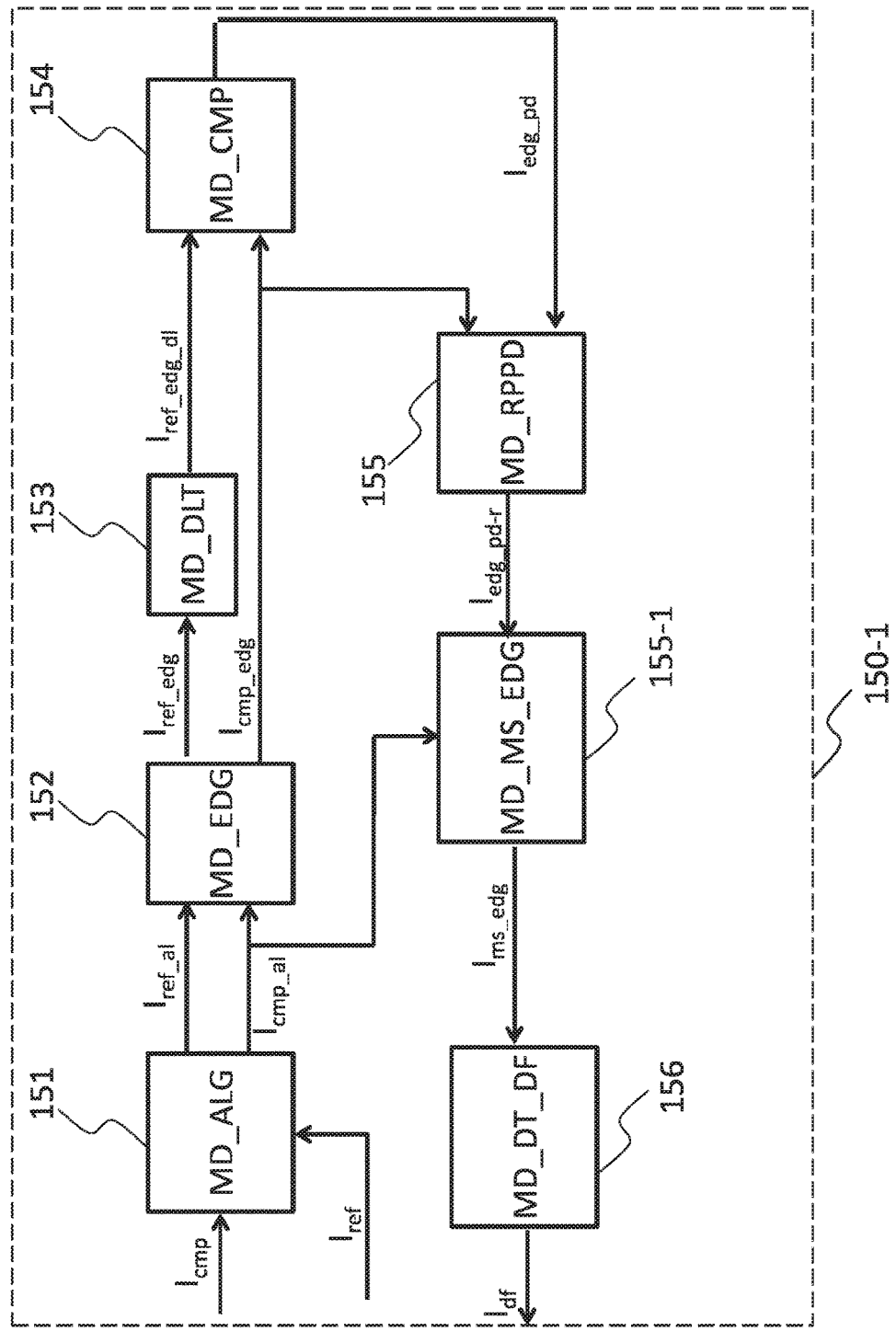

FIG. 4B shows the processing unit 150-1 according to the second embodiment of the invention.

The processing unit 150-1 executes a software program, which comprises one or more software modules that performs the steps of the method for detecting defects on tyres represented by the flow diagram 200-1.

The processing unit 150-1 differs from the processing unit 150 of the first embodiment of the invention due to the presence of an edge measurement module 155-1 interposed between the restoration module 155 and the defect detection module 156 and having the function of generating the measured edges image $I_{ms\_edg}$.

In addition the processing unit 150-1 differs from the processing unit 150 due to the fact that the defect detection module 156 is configured to identify as defects the edges included in the measured edges image $I_{ms\_edg}$.

The edge measurement module 155-1 has the function of confirming as defects the edges (of the edge image of restored possible defects $I_{edg\_pd-r}$) which have a sufficiently large length.

In particular, the edge measurement module 155-1 is configured, for an i-th edge $C_i$ (i=1, 2 ... n) selected from among the n edges $C_1, C_2, \ldots C_n$ of the edge image of restored possible defects $I_{edg\_pd-r}$, to generate a plurality m of edge measurement profiles $S_{pmc-1}, S_{pmc-2}, \ldots S_{pmc-m}$ respectively centred on a plurality m of different points $P_1, P_2, \ldots P_m$ belonging to the edge $C_i$, wherein said plurality m of edge measurement profiles $S_{pmc-1}, S_{pmc-2}, \ldots S_{pmc-m}$ is associated with respective pluralities of light intensity values calculated as a function of the values of respective portions of the aligned sample image $I_{cmp\_al}$ respectively centred on said plurality m of points $P_1, P_2, \ldots P_m$.

In other words, a first edge measurement profile $S_{pmc-1}$ is generated that is centred on a first point $P_1$ of the edge $C_i$ of the edge image of restored possible defects $I_{edg\_pd-r}$, a second edge measurement profile $S_{pmc-2}$ is generated centred on a second point $P_2$ of the edge $C_i$ of the edge image of restored possible defects $I_{edg\_pd-r}$, ... and so forth until the m-th edge measurement profile $S_{pmc-m}$ centred on the m-th point $P_m$ of the edge $C_i$ of the edge image of restored possible defects $I_{edg\_pd-r}$.

The size of the m edge measurement profiles is selected so as to be greater than the maximum size of the possible substantially monodimensional defects on the sample tyre. For example, in the case of substantially monodimensional, substantially rectilinear defects with width comprised between 0.2 millimeters and 0.5 millimeters, the size of the edge measurement profiles can be selected equal to several dozen pixels.

For example, the points $P_1, P_2, \ldots P_m$ correspond to the pixels (identified by a pair of coordinates x-y) of the i-th edge $C_i$ of the edge image of restored possible defects $I_{edg\_pd-r}$. Alternatively, the edge image of restored possible defects $I_{edg\_pd-r}$ can be sub-sampled: in this case, a point $P_j$ (of the plurality m of points $P_1, P_2, \ldots P_m$) is a value representative of a plurality of pixels of the edge image of restored possible defects $I_{edg\_pd-r}$.

The j-th edge measurement profile $S_{pmc-j}$ (selected from among the m edge measurement profiles $S_{pmc-1}, S_{pmc-2}, \ldots S_{pmc-m}$) comprises a plurality of values that are calculated as a function of the values of the light intensity of one or more chromatic components of the pixels of a portion of the aligned sample image $I_{cmp\_al}$ centred on the j-th point $P_j$ (selected from among the m points $P_1, P_2, \ldots P_m$ belonging to the i-th edge $C_i$). Analogous observations can be applied to the calculation of the further edge measurement profiles $S_{pmc-1}, S_{pmc-2}, \ldots S_{pmc-m}$.

Preferably, the image acquired by the camera 141 is black-white: in this case, the light intensity represents the level in grey scale of the considered pixel, having values comprised between 0 and 255. Alternatively, the image acquired by the camera 141 is a colour image and is represented with the model RGB: in this case, the chromatic component is the green, red or blue component of the considered pixel, and has values comprised between 0 and 255.

The preceding observations relative to the edge $C_i$ of the edge image of restored possible defects $I_{edg\_pd-r}$ can be applied to each of the edges $C_1, C_2, \ldots C_n$ of the edge image of restored possible defects $I_{edg\_pd-r}$, i.e. for each edge, a respective plurality of edge measurement profiles is generated.

In other words, the first edge $C_1$ between the n edges $C_1, C_2, \ldots C_n$ belonging to the edge image of restored possible defects $I_{edg\_pd-r}$ is first taken into account. The first edge $C_1$ comprises $m_1$ points, each of which corresponding to a pixel.

Subsequently, the first point $P_1$ from among the $m_1$ points of the first edge $C_1$ is taken into account. The aligned sample image $I_{cmp\_al}$ is then read and from this an image portion is selected that is centred around the first point $P_1$ (i.e. it is centred on the coordinates of the pixel that represents the first point $P_1$).

Figure 5A:
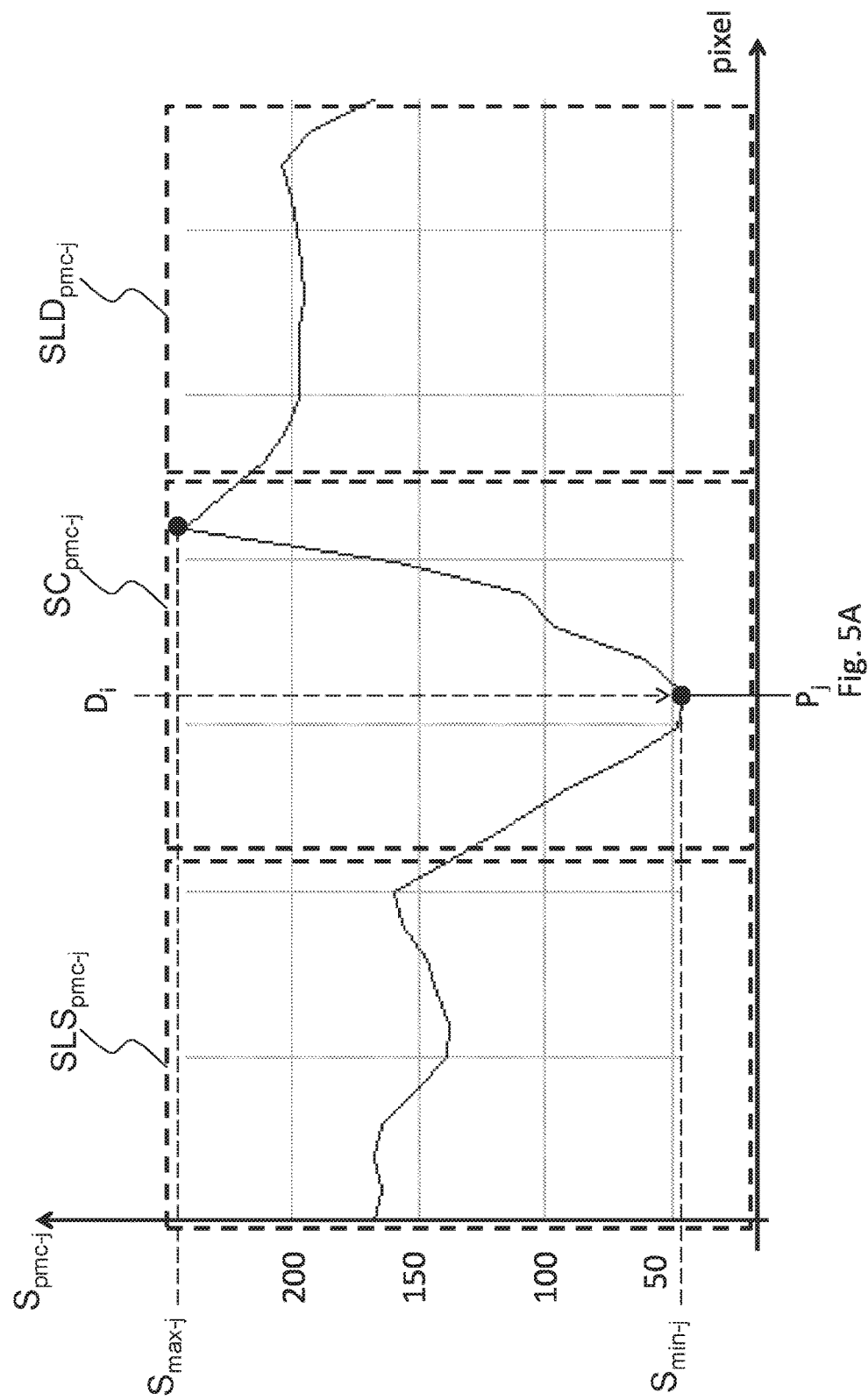
FIG. 5A shows an edge measurement profile centred on a point that belongs to a cut on a surface portion of the sample tyre.
Figure 5B:
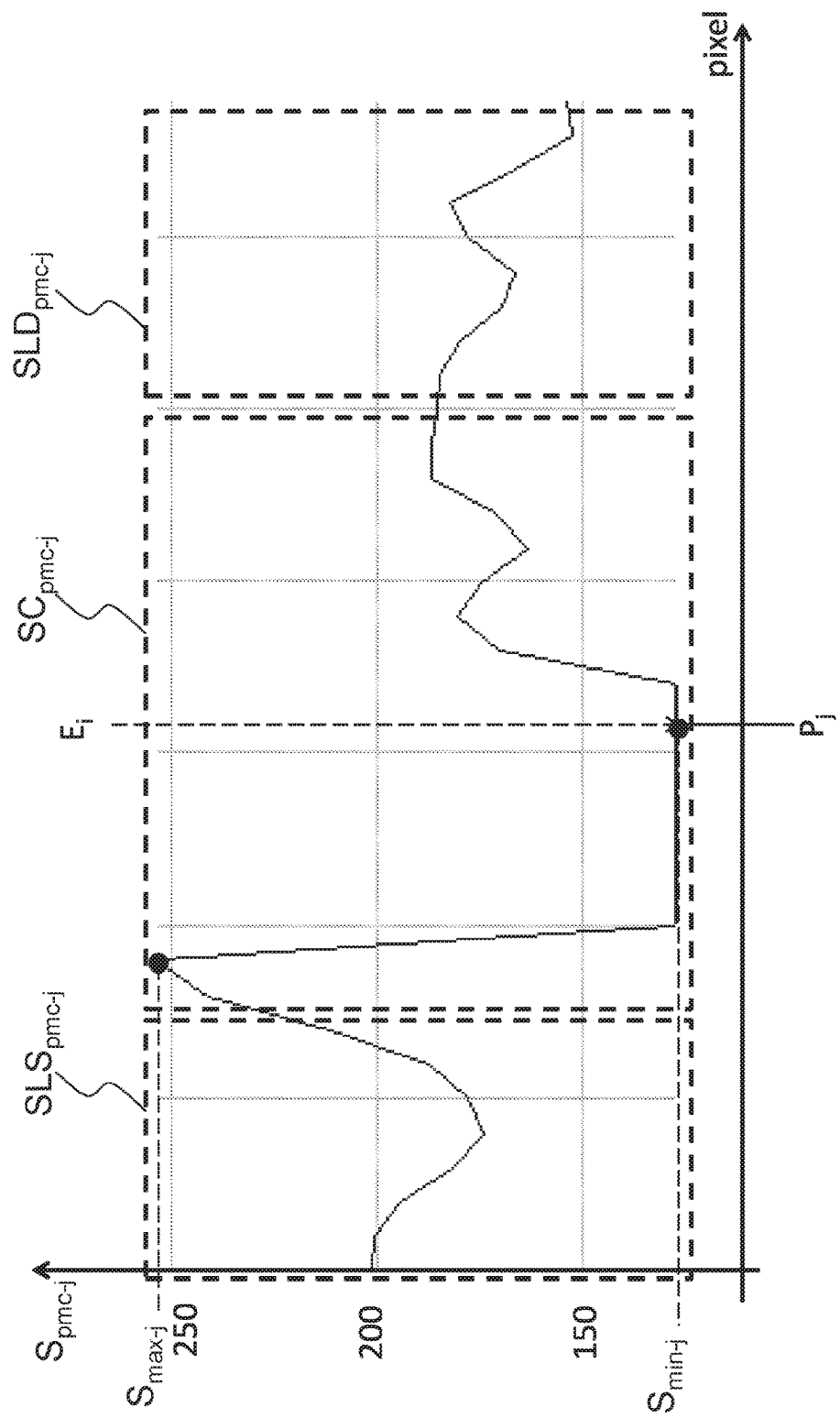
FIG. 5B shows an edge measurement profile centred on a point that belongs to a non-defective element on the surface portion of the sample tyre.

Subsequently, the values of the pixels of said image portion are processed and a plurality of values is generated therefrom which represent the first edge measurement profile $S_{pmc-1}$ centred around the first point $P_1$, as shown in FIGS. 5A-5B.

The preceding operations relative to point $P_1$ are repeated for a second point $P_2$ from among $m_1$ points of the first edge $C_1$ so as to generate a second edge measurement profile $S_{pmc-2}$ centred around the second point $P_2$. Finally, the preceding operations are repeated for all the further points of the first edge $C_1$, thus obtaining $m_1$ edge measurement profiles $S_{pmc-1}, S_{pmc-2}, \ldots S_{pmc-m1}$ respectively centred on the points $P_1, P_2, \ldots P_{m1}$.

The preceding observations relative to the edge $C_1$ are applicable in an analogous manner also to the edges $C_2$, thus obtaining $m_2$ edge measurement profiles $S_{pmc-1}, S_{pmc-2}, \ldots S_{pmc-m2}$ for the edge $C_2$, ... and so forth until $m_n$ edge measurement profiles $S_{pmc-1}, S_{pmc-2}, \ldots S_{pmc-mn}$ are obtained for the edge $C_n$.

Advantageously, a j-th edge measurement profile $S_{pmc-j}$ (centred on the j-th point $P_j$) is generated in the following manner. For the sake of simplicity, it is considered that the point $P_j$ corresponds to a pixel. The edge measurement module 155-1 is such to take into account a portion of the aligned sample image $I_{cmp\_al}$ centred on the j-th point $P_j$ selected between the plurality m of points $P_1, P_2, \ldots P_m$ belonging to the i-th edge $C_i$. It is assumed that said portion is a matrix of r lines and c columns composed of r×c pixels of the acquired sample image $I_{cmp}$, wherein said matrix is centred on the considered pixel $P_j$. More particularly, each line of the matrix comprises r values of the pixels along the axial direction of the tread of the sample tyre and thus each column of the matrix comprises the values of the pixels along the circumferential direction of the tread of the sample tyre. Subsequently, for each line of the matrix, the edge measurement module 155-1 is such to calculate only one value representative of the respective values of the line; for example, said value is the average value of the pixels of the considered line. A vector of size r is then considered which represents the j-th edge measurement profile $S_{pmc-j}$ centred on the point $P_j$ of the edge $C_i$ of the edge image of restored possible defects $I_{edg\_pd-r}$. It is observed that the generation of the j-th edge measurement profile $S_{pmc-j}$ as previously illustrated is particularly advantageous, since not only is the j-th point $P_j$ considered, but also the points adjacent thereto in the axial direction: in this manner, the probability of committing errors caused by artefacts is reduced, which could generate false indications of edges in the aligned sample image $I_{cmp\_al}$.

With the matrix centred on the j-th point $P_j$ of the i-th edge $C_i$, a first average value is calculated as a function of the values of the pixels of the first line, then a second average value is calculated as a function of the values of the pixels of the second line, . . . etc. until the n-th average value is calculated as a function of the values of the pixels of the n-th line. A vector is then obtained that represents the j-th edge measurement profile $S_{pmc-j}$ (see for example FIGS. 5A-5B) centred on the point $P_j$ of the edge $C_i$ of the edge image of restored possible defects $I_{edg\_pd-r}$.

Preferably, the edge measurement module 155-1 is also configured, for a j-th edge measurement profile $S_{pmc-j}$ (j=1, 2, . . . m) selected from among the m edge measurement profiles $S_{pmc-1}$, $S_{pmc-2}$, . . . $S_{pmc-m}$ of the i-th edge $C_i$, in order to:

calculate the minimum value $S_{min-j}$ and maximum value $S_{max-j}$ of the values of a central portion $SC_{pmc-j}$ (see FIGS. 5A-5B) of the j-th selected edge measurement profile $S_{pmc-j}$;

identify a possible defective point $P_{pd-j}$ as a function of the comparison between the minimum values $S_{min-j}$ and maximum values $S_{max-j}$;

repeating the calculation of the minimum value $S_{min-j}$ and maximum value $S_{max-j}$ and of the identification of the possible defective point for further edge measurement profiles $S_{pmc-j}$, thus generating possible further possible defective points $P_{pd-j}$.

The preceding observations are applicable in an analogous manner for the further edges $C_i$ of the aligned sample image $I_{cmp\_al}$, therefore the edge measurement module 155-1 is such to generate, at the output, the measured edges image $I_{ms\_edg}$, which contains the edges that have been confirmed as defective by the edge measurement module 155-1.

Preferably, once again considering the preceding example, $m_1$ edge measurement profiles $S_{pmc-1}$, $S_{pmc-2}$, . . . $S_{pmc-m1}$ were generated from the first edge $C_1$. The first edge measurement profile $S_{pmc-1}$ is then taken into account and the first minimum value $S_{min-1}$ and the first maximum value $S_{max-1}$ of the values of the central portion $SC_{pmc-1}$ of the first edge measurement profile $S_{pmc-1}$ are calculated. Subsequently, a first and a second value representative of the values of the side portions $SLS_{pmc-1}$, $SLD_{pmc-1}$ of the first edge measurement profile $S_{pmc-1}$ are calculated. Finally, a first possible defective point $P_{pd-1}$ is identified as a function of the comparison between the first minimum value $S_{min-1}$ and the first maximum value $S_{max-1}$ with respect to the first and second value.

The preceding operations are repeated for a second edge measurement profile $S_{pmc-2}$ so as to possibly generate a second possible defective point $P_{pd-2}$.

Finally, the preceding operations are repeated for all the further edge measurement profiles $S_{pmc-3}$, . . . $S_{pmc-m1}$ of the first edge $C_1$, thus obtaining the possible defective points $P_{pd1}$ belonging to the first edge $C_1$.

Preferably, the first and the second value are calculated by means of one from among the following operations:

average of the values of the side portions $SLS_{pmc-j}$, $SLD_{pmc-j}$ of the j-th edge measurement profile $S_{pmc-j}$;

median of the values of the side portions $SLS_{pmc-j}$, $SLD_{pmc-j}$ of the j-th edge measurement profile $S_{pmc-j}$;

mode of the values of the side portions $SLS_{pmc-j}$, $SLD_{pmc-j}$ of the j-th edge measurement profile $S_{pmc-j}$.

Advantageously, a possible defective point $P_{pd-j}$ is identified as a function of the comparison between the minimum values $S_{min-j}$ and maximum values $S_{max-j}$ with respect to the first and second value on the basis of different criteria.

A first criterion for the identification of a possible defective point $P_{pd-j}$ is the following:

the minimum value $S_{min-j}$ of the values of the central portion $SC_{pmc-j}$ of the j-th edge measurement profile $S_{pmc-j}$ centred on the j-th point $P_j$ of the i-th edge $C_i$ is calculated and the respective position of the pixels is stored;

the maximum value $S_{max-j}$ of the values of the central portion $SC_{pmc-j}$ of the j-th edge measurement profile $S_{pmc-j}$ is calculated and the position of the corresponding pixel is stored;

it is verified if the position of the pixel corresponding to the maximum value $S_{max-j}$ precedes the position of the pixel corresponding to the minimum value $S_{min-j}$:

if the position of the pixel corresponding to the maximum value $S_{max-j}$ is subsequent to the position of the pixel corresponding to the minimum value $S_{min-j}$, the point $P_j$ of the edge $C_i$ is identified as possible defective point $P_{pd-j}$: this condition in fact occurs if a cut is present that first determines the presence of a rather low light intensity and then determines the presence of a sufficiently high light intensity, as will be explained more in detail hereinbelow with reference to FIG. 5A;

if the position of the pixel corresponding to the maximum value $S_{max-j}$ precedes the position of the pixel corresponding to the minimum value $S_{min-j}$, the point $P_j$ of the edge $C_i$ is not identified as possible defective point $P_{pd-j}$: this condition in fact occurs if a non-defective element is present that first determines the presence of a sufficiently high light intensity and then determines the presence of a sufficiently low light intensity, as will be explained more in detail hereinbelow with reference to FIG. 5B.

For example, FIG. 5A shows that the pixel corresponding to the maximum value $S_{max-j}$ is subsequent to the pixel corresponding to the minimum value $S_{min-j}$: therefore the point $P_j$ is identified as a possible defective point $P_{pd-j}$.

Differently, FIG. 5B shows that the pixel corresponding to the maximum value $S_{max-j}$ precedes the pixel corresponding to the minimum value $S_{min-j}$: therefore the point $P_j$ is not identified as a possible defective point.

A second criterion allows to verify if the size of the minimum value $S_{min-j}$ and of the maximum value $S_{max-j}$ is caused by a possible cut or if it is caused by the normal variability of the image acquisition process.

The second criterion for the identification of a possible defective point $P_{pd-j}$ is the following:

the minimum value $S_{min-j}$ of the values of the central portion $SC_{pmc-j}$ of the j-th edge measurement profile $S_{pmc-j}$ centred on the j-th point $P_j$ of the i-th edge $C_i$ is calculated;

the maximum value $S_{max-j}$ of the values of the central portion $SC_{pmc-j}$ of the j-th edge measurement profile $S_{pmc-j}$ is calculated;

a first value $S1_{avg-j}$ and a second value $S2_{avg-j}$ are calculated (e.g. the average values) representative of the values of the side portions $SLS_{pmc-j}$, $SLD_{pmc-j}$ of the j-th edge measurement profile $S_{pmc-j}$;

it is verified if the minimum value $S_{min-j}$ is greater than the sum of the first value $S1_{avg-j}$ and the value of a first side threshold and is greater than the sum of the second value $S2_{avg-j}$ and the value of a second side threshold:

in affirmative case, the point $P_j$ of the edge $C_i$ is not identified as possible defective point, since the minimum value of the central zone is not sufficiently low with respect to the values of the side zones;

in negative case, the point $P_j$ of the edge $C_i$ is identified as possible defective point $P_{pd-j}$, since the minimum value of the central zone is sufficiently low with respect to the values of the side zones;

it is verified if the maximum value $S_{max-j}$ is smaller than the sum of the first value $S1_{avg-j}$ and the value of a third side threshold and if it is smaller than the sum of the second value $S2_{avg-j}$ and the value of a fourth side threshold:

in affirmative case, the point $P_j$ of the edge $C_i$ is not identified as possible defective point $P_{pd-j}$, since the maximum value of the central zone is not sufficiently high with respect to the values of the side zones;

in negative case, the point $P_j$ of the edge $C_i$ is identified as possible defective point $P_{pd-j}$, since the maximum value of the central zone is sufficiently high with respect to the values of the side zones.

A third criterion allows to verify if a cut is present having a non-negligible thickness, omitting scratches or small isolated holes.

The third criterion for the identification of a possible defective point $P_{pd-j}$ is the following:

the number of pixels is calculated of the j-th edge measurement profile $S_{pmc-j}$ (centred on the j-th point $P_j$) having values smaller than the sum of the first value $S1_{avg-j}$ (e.g. the average value) and the value of a first thickness threshold and having values smaller than the sum of the second value $S2_{avg-j}$ (in the example, the average value) and of the value of the first thickness threshold;

the number of pixels is calculated of the j-th edge measurement profile $S_{pmc-j}$ having values greater than the sum of the first value $S1_{avg-j}$ and the value of a second thickness threshold and having values greater than the sum of the second value $S2_{avg-j}$ and the value of the second thickness threshold;

if the sum of the pixels calculated in the two preceding steps is less than the value of a third thickness threshold, the point $P_j$ of the edge $C_i$ is not identified as possible defective point;

if the sum of the pixels calculated in the two preceding steps is greater than or equal to the value of the third thickness threshold, the point $P_j$ of the edge $C_i$ is identified as possible defective point $P_{pd-j}$.

The above-described three criteria can be used separately or in any combination: the use of a combination of criteria can increase the reliability of the detection of a defect (a cut, in the considered examples). Further criteria can be designed by the person skilled in the art on the basis of the indications and teachings of the present invention.

Preferably, the defect detection module 156 of the second embodiment is further configured to generate the defects signal $I_{df}$ representative of the edges marked as defects (i.e. the edges included in the measured edges image $I_{ms\_edg}$).

Preferably, the measured edges image $I_{ms\_edg}$ (possibly superimposed on the aligned sample image $I_{cmp\_al}$) is displayed on a screen present in the production line 1 (e.g. the screen is connected to the control station 30 or is part of the apparatus 100 inside the control station 30): in this manner, a human operator assigned for the quality control can immediately display the presence and the position of the defect (in particular, of the cut D1) on the sample tyre. The image displayed on the screen can include a square that encloses the area in which the defect is detected, in a manner so as to further facilitate the identification of the position of the defect.

Alternatively, the measured edges image $I_{ms\_edg}$ is converted into a text file which contains the indication of the presence of the defect D1, of its position and length.

Preferably, the value of the defect threshold is a percentage (for example 70%) of the length of the i-th selected edge $C_i$.

Figure 3F:
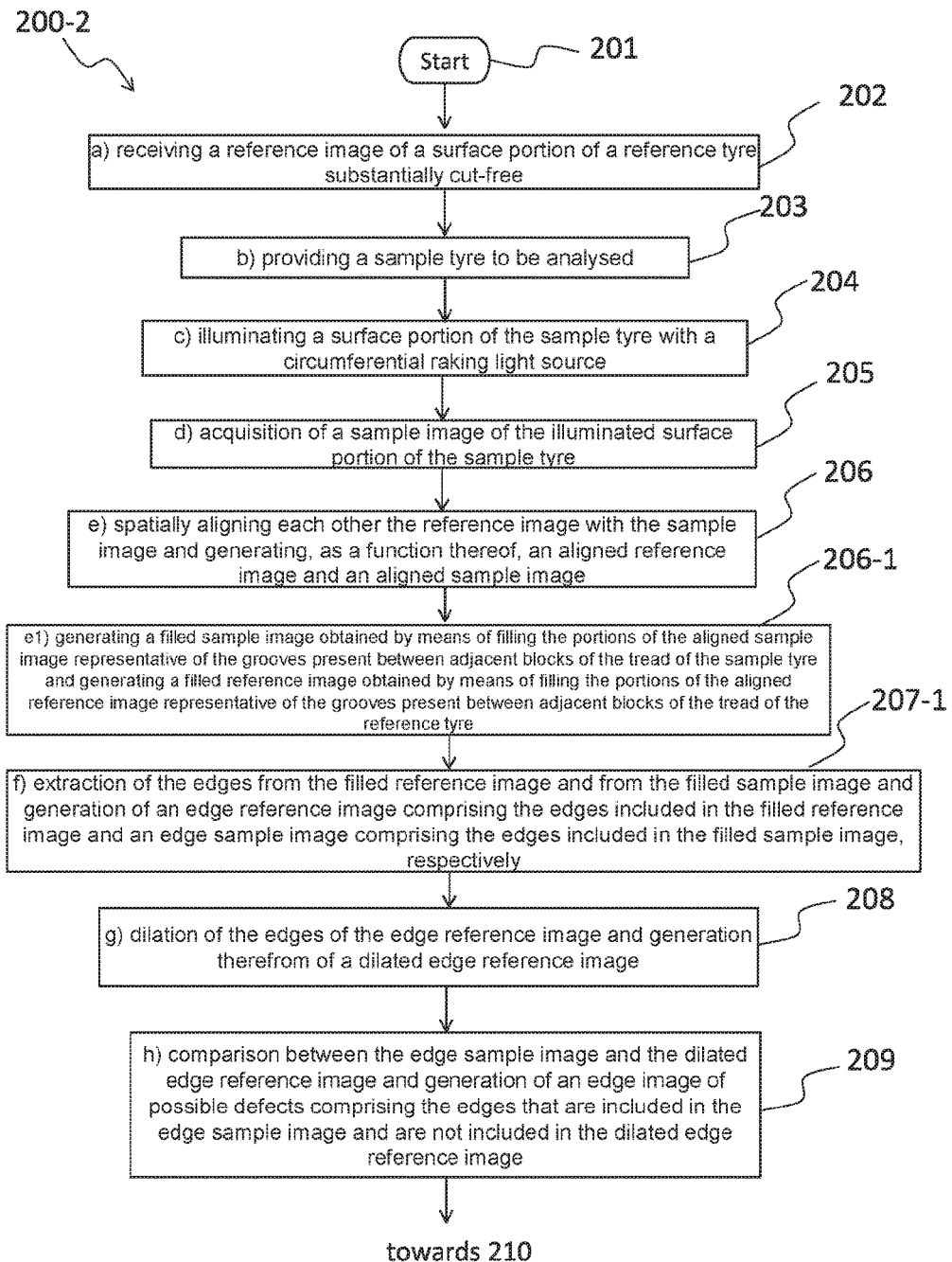
Figure 3G:
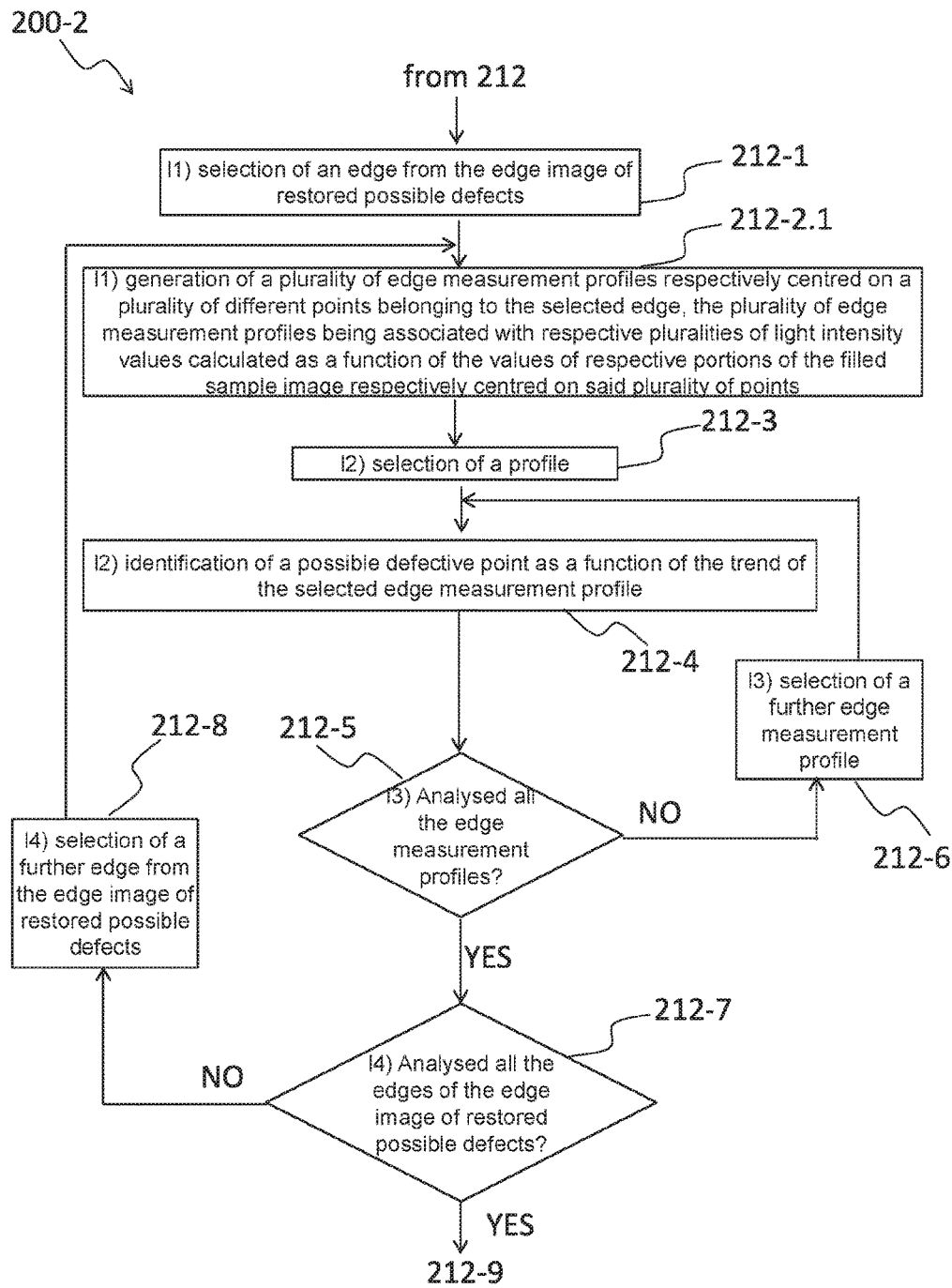

With reference to FIGS. 3F-3G, the flow diagram 200-2 is shown of a part of the method for detecting defects on tyres in a tyre production process according to a third embodiment of the invention.

The third embodiment is used if the surface portion of the reference and sample tyres 103 are portions of the respective treads comprising a plurality of blocks, i.e. wherein the tread comprises a specific design in relief formed by the position of the blocks and wherein said design is the same for the reference and sample tyres 103.

The flow diagram 200-2 allows preventing the grooves present on the tread of the sample tyre from being identified as defects, and/or preventing possible brightness variations due to the depth of the grooves themselves from giving rise to a generation of false edges.

The flow diagram 200-2 differs from the flow diagram 200-1 of the first embodiment due to the further presence of step 206-1, due to the presence of step 207-1 in place of step 207 and due to the presence of step 212-2.1 in place of step 212-2.

Therefore the flow diagram 200-2 of the third variant is composed of the set of FIGS. 3F, 3C and 3G.

Step 206-1 is interposed between step 206 and step 207-1.

In step 206-1, a filled sample image $I_{cmp\_rp}$ is generated that is obtained by means of filling the portions of the aligned sample image $I_{cmp\_al}$ representative of the grooves present on the tread of the sample tyre and a filled reference image $I_{ref\_rp}$ is generated that is obtained by means of filling the portions of the aligned reference image $I_{ref\_al}$ representative of the grooves present on the tread of the reference tyre.

For example, the filling is carried out by substituting the pixels of the aligned sample image $I_{cmp\_al}$ representative of the groove with pixels having values of light intensity predefined or calculated as a function of the values of the pixels adjacent to the considered groove: in this manner, the calculation procedures are simplified and the edges of the blocks are prevented from being identified as edges of possible defects by the defect detection module 156 or by the edge measurement module 155-1.

Analogous considerations are applicable for the filling of the pixels of the aligned reference image $I_{ref\_al}$.

Preferably, the pixels representative of a groove are assigned with light intensity values (in grey scale) equal to 0, which corresponds to black.

Alternatively, the values of the pixels representative of the groove can be assigned a value equal to the average value of the pixels adjacent to the groove itself.

In step 207-1, the extraction of the edges from the filled reference image $I_{ref\_rp}$ and from the filled sample image $I_{cmp\_rp}$ is carried out, and an edge reference image $I_{ref\_edg}$ comprising the edges included in the filled reference image and an edge sample image $I_{cmp\_edg}$ comprising the edges included in the filled sample image are generated respectively.

In step 212-2.1, a plurality of edge measurement profiles is generated respectively centred on a plurality of different points belonging to the selected edge, the plurality of edge measurement profiles being associated with respective pluralities of light intensity values calculated as a function of the values of respective portions of the filled sample image respectively centred on said plurality of points.

Figure 4C:
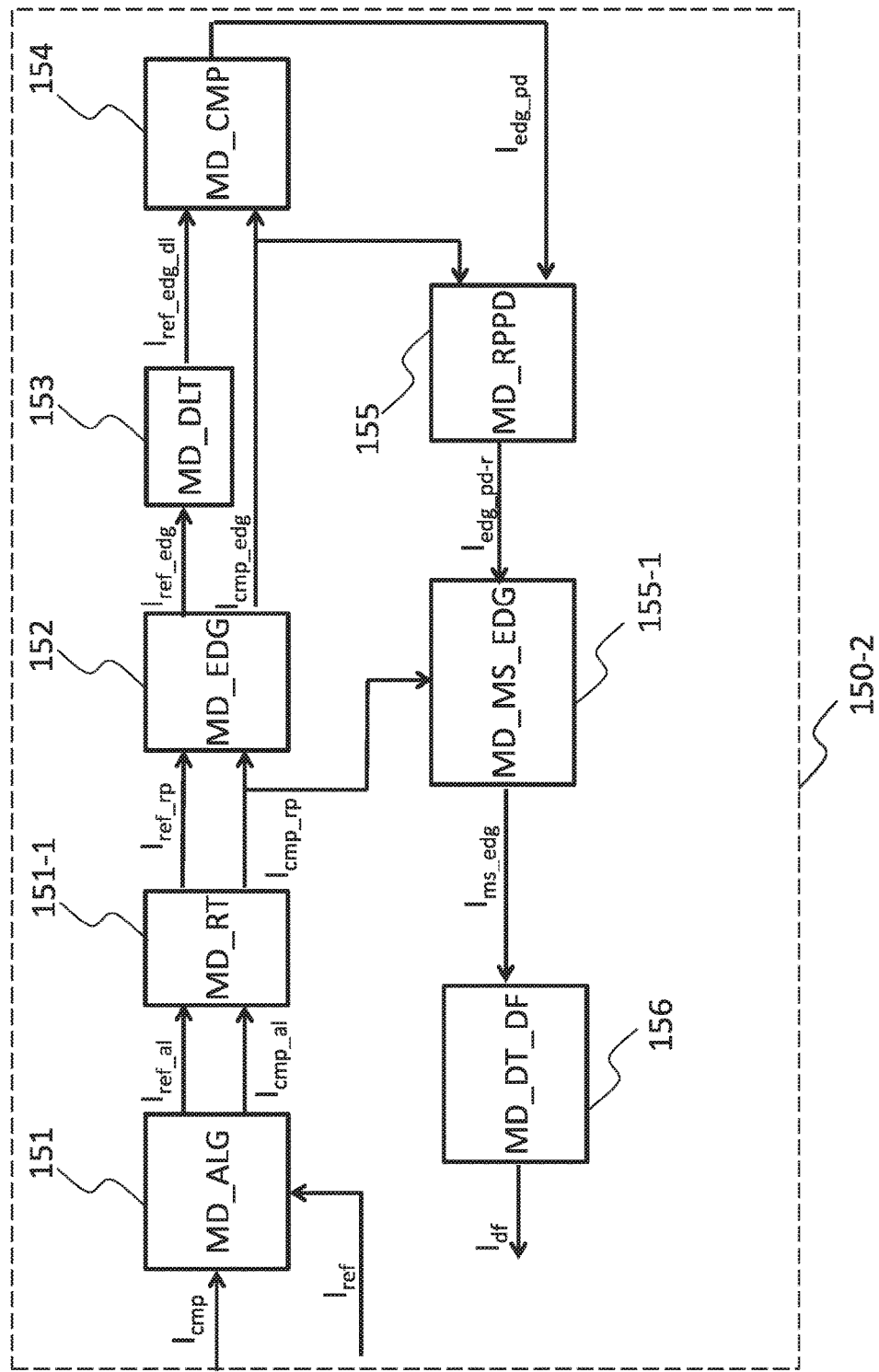

FIG. 4C shows the processing unit 150-2 according to the third embodiment of the invention.

The processing unit 150-2 executes a software program, which comprises one or more software modules that perform the steps of the method for detecting defects on tyres represented by the flow diagram 200-2.

The processing unit 150-2 differs from the processing unit 150-1 of the second embodiment due to the further presence of a filling module 151-1 interposed between the alignment module 151 and the edge extraction module 152.

The filling module 151-1 is configured to receive the aligned sample image $I_{cmp\_al}$ and to generate the filled sample image $I_{cmp\_rp}$ obtained by means of filling the portions of the aligned sample image $I_{cmp\_al}$ representative of the grooves present on the tread of the sample tyre.

Analogously, the filling module 151-1 is further configured to receive the aligned reference image $I_{ref\_al}$ and to generate a filled reference image $I_{ref\_rp}$ obtained by means of filling the portions of the aligned reference image $I_{ref\_al}$ representative of the grooves present on the tread of the reference tyre.

It is observed that the case has been considered wherein the filled reference image $I_{ref\_rp}$ is obtained in real time as a function of the aligned reference image $I_{ref\_al}$, by means of the alignment module 153 and of the filling module 159 during their functioning. Alternatively, in the case wherein the aligned reference image $I_{ref\_al}$ is maintained fixed in the alignment process, the filled reference image $I_{ref\_rp}$ can be obtained in advance in the configuration step, by means of a processing analogous to that of the filling module 151-1: in this case the filled reference image $I_{ref\_rp}$ is an input to the edge extraction module 152.

In addition the third embodiment differs from the second embodiment due to the fact that the edge extraction module 152 receives, in input, the filled sample image $I_{cmp\_rp}$ (instead of the aligned sample image $I_{cmp\_al}$) and the filled reference image $I_{ref\_rp}$ (instead of the aligned reference image $I_{ref\_al}$): therefore, the edge extraction module 152 is such to carry out the extraction of the edges from the filled sample image $I_{cmp\_rp}$ and from the filled reference image $I_{ref\_rp}$.

Finally, the third embodiment differs from the second embodiment due to the fact that the edge measurement module 155-1 receives, in input, the filled sample image $I_{cmp\_rp}$ (instead of the aligned sample image $I_{cmp\_al}$): therefore the j-th edge measurement profile $S_{pmc-j}$ is calculated by using portions of the filled sample image $I_{cmp\_rp}$ centred around the j-th point $P_j$ of the i-th edge $C_1$ of the edge image of restored possible defects $I_{edg\_pd-r}$.

According to a variant of the third embodiment (not shown in the Figure), the flow diagram 200-2 differs from the flow diagram 200 of the first embodiment due to the further presence of step 206-1 after step 206 and due to the presence of step 207-1 in place of step 207; in other words, according to the variant of the third embodiment, the flow diagram does not comprise the steps shown in FIG. 3G, but rather only those of FIGS. 3A-3B modified with step 206-1 after step 206 and with step 207-1 in place of step 207.

In addition, according to said variant of the third embodiment, the processing unit 150-2 differs from the processing unit 150 of the first embodiment due to the further presence of the filling module 151-1 interposed between the alignment module 151 and due to the fact that the edge extraction module 152 receives, in input, the filled sample image $I_{cmp\_rp}$ (instead of the aligned sample image $I_{cmp\_al}$) and the filled reference image $I_{ref\_rp}$ (instead of the aligned reference image $I_{ref\_al}$).

With reference to FIG. 5A, the j-th edge measurement profile $S_{pmc-j}$ is shown, centred on the j-th point $P_j$ which belongs to the i-th edge $C_1$ obtained from a cut $D_i$ (e.g. the edge $C_{D1}$ of the cut D1 shown in FIGS. 6A-6B) present on the tread of a sample tyre 103. The profile of a considered band is shown, which is extended around the rotation axis of the tyre along a portion of a series of pixels constituting an acquired image of the circumferential surface of the tread of the sample tyre 103.

On the x-axis, the distance is indicated along the circumferential surface with respect to a reference point placed on the considered band; in particular, the values of the x-axis represent the coordinates of the pixels of the considered band.

On the y-axis, the value of light intensity in grey scale is indicated, corresponding to the considered pixels.

FIG. 5A also shows the central portion $SC_{pmc-j}$ of the j-th (j=1, 2, ... m) edge measurement profile $S_{pmc-j}$ centred on the j-th point $P_j$ and shows the two corresponding side portions $SLS_{pmc-j}$, $SLD_{pmc-j}$ adjacent to the central portion $SC_{pmc-j}$.

It is possible to observe, in FIG. 5A, the following trend of the light intensity of the edge measurement profile $S_{pmc-j}$:
  the values of the light intensity comprised in a first pixel portion have values sufficiently greater than zero (in FIG. 5A, comprised between 140 and 160);
  the values of the light intensity comprised in a second pixel portion have a trend decreasing with high slope, until a small minimum value $S_{min-j}$ (in FIG. 5A, below 50) is attained;
  the values of the light intensity comprised in a third pixel portion following the minimum value $S_{min-j}$ have a trend increasing with high slope (in FIG. 5A, increasing from the value $S_{min-j}$ to the value $S_{max-j}$ close to 255);
  the values of the light intensity comprised in a fourth pixel portion have values sufficiently greater than zero (in FIG. 5A, around 160-220).

Therefore, the trend of the light intensity of FIG. 5A indicates that first an interval is present in which there is light (first pixel portion), then an interval is present in which the light intensity reaches a rather low value (or lack of light, second pixel portion up to the minimum $S_{min-j}$) and then once again an interval is present in which there is light (third and fourth pixel portion): this indicates the presence of a cut, since an interval was detected in which the intensity of the light is much lower (cavity of the cut) and two adjacent intervals were detected in which the light is present (zones adjacent to the cavity of the cut).

It is observed that it is possible to detect said trend of the light intensity by means of the raking direction of the light radiation $R_d$ emitted by the light source 131, which allows illuminating the zones adjacent to the cut, while the zone corresponding to the cut remains substantially in the dark.

With reference to FIG. 5B, the j-th edge measurement profile $S_{pmc\text{-}j}$ is shown, centred on the j-th point $P_j$ which belongs to the i-th edge $C_i$ obtained from a non-defective element $E_i$ (e.g. a joint line between adjacent sectors) present on the tread of a sample tyre 103. Also in this case, the profile is shown of a considered band that is extended around the rotation axis of the tyre along a portion of a series of pixels constituting an acquired image of the circumferential surface of the tread of the sample tyre 103.

It is possible to observe, in FIG. 5B, the following trend of the light intensity of the edge measurement profile $S_{pmc\text{-}j}$:
- the values of the light intensity comprised in a first portion are sufficiently greater than zero (in FIG. 5B, comprised between 170 and 255);
- the values of the light intensity comprised in a second portion have rather small values, and in particular they are much smaller in a sub-portion (in FIG. 5B, values about equal to 120).

Therefore, the trend of the light intensity of FIG. 5B first indicates that an interval is present in which there is light having a sufficiently high light intensity (first pixel portion) and then indicates that an interval is present in which the light intensity is rather low (second pixel portion): this indicates the presence of an extended element in relief, since the circumferential raking direction of the light radiation $R_d$ emitted by the light source 131 only allows illuminating the surface zone that precedes the element in relief, while the surface zone following the relief element remains substantially in the dark. Such element is not classified as a defect.

According to a first variant of the first, second or third embodiment, the processing unit further comprises a module for filtering out coloured writing and lines (not shown in FIGS. 4A-4C) interposed between the alignment module 151 and the edge extraction module 152. In addition, the camera 141 is such to acquire a colour image of the portion of the sample tyre and the alignment module 151 is such to receive the colour reference image.

It is known that a tyre can comprise coloured writing and lines, such as writing on the sidewall of the tyre, and/or coloured writing that is printed on the tread band in order to identify it during the production process. Said coloured writing and lines can be of different type, of different colour and can be in different positions.

The module for filtering out coloured writing and lines has the function of identifying and filtering out said coloured writing and lines present both on the reference tyre, and on the sample tyre, preventing these from being considered in the subsequent modules of the processing unit, thus preventing the generation of false alarm indications.

Therefore, the coloured writing and lines filtering module is such to receive, in input, the aligned reference image $I_{ref\_al}$ and is such to generate at the output a filtered reference image $I_{ref\_fl}$ obtained by means of the filtering out of the coloured writing and lines included in the aligned reference image $I_{ref\_al}$, or by marking the portions of the aligned reference image $I_{ref\_al}$ which contains said coloured writing or lines.

Analogously, the coloured writing and lines filtering module is such to receive, in input, the aligned sample image $I_{cmp\_al}$ and is such to generate at the output a filtered sample image $I_{cmp\_fl}$ obtained by means of the filtering out of the coloured writing and lines included in the aligned sample image $I_{cmp\_al}$, or by marking the portions of the aligned sample image $I_{cmp\_a}$ which contains said coloured writing or lines.

Consequently, the edge extraction module 152 is such to receive, in input, the filtered reference image $I_{ref\_fl}$ (instead of the aligned reference image $I_{ref\_al}$) and the filtered sample image $I_{cmp\_fl}$ (instead of the aligned sample image $I_{cmp\_al}$) and it is such to extract the edges therefrom as explained above, with the difference that the edge extraction module 152 is such that it does not consider the portions that have been marked by the coloured writing and lines filtering module.

For example, the coloured writing and lines filtering module can comprise the following sub-modules connected in series:
- a first sub-module configured to carry out a filtering operation, for example of Gaussian type;
- a second sub-module configured to carry out a filtering, for example of median type, in order to make the coloured writing or lines more uniform;
- a third sub-module configured to carry out a conversion from the colour space, for example from type RGB to type HSV;
- a fourth sub-module to compare the three components of the HSV space with respect to three respective threshold values;
- a fifth sub-module configured to carry an erosion operation for the image exiting from the fourth sub-module;
- a sixth sub-module configured to carry out a dilation operation for the image exiting from the fifth sub-module;
- a seventh sub-module configured to mark the portions of the image exiting from the sixth sub-module.

According to a second variant of the first, second or third embodiment, the processing unit further comprises a pre-filtering edges module (not shown in FIGS. 4A-4C) interposed between the edge extraction module 152 and the comparison module 154.

The pre-filtering edges module has the function of identifying and eliminating the edges of the edge sample image $I_{cmp\_edg}$ that are representative of several elements of the sample tyre not classifiable as defects, such as:
- reliefs with circle (or arc) form caused by the presence of air outlets;
- surface imperfections caused by the cleaning of the mould, which generate very small edges.

In this manner, the edges generated by the above-indicated elements are prevented from being taken into account in the subsequent modules of the processing unit, thus preventing the generation of false indications of defects.

According to a third variant of the first, second or third embodiment, the processing unit further comprises a post-filtering module (not shown in FIGS. 4A-4C) connected to the output of the restoration module 155.

The post-filtering module has the function of identifying and eliminating the edges (of the edge image of restored possible defects $I_{edg\_pd\text{-}r}$) representative of non-defective elements (join lines between adjacent sectors, reliefs with circle or arc form, tread joints, surface imperfections) that were added by the restoration module 155.

Indeed, as explained above, the restoration module 155 is such to restore (in the edge image of restored possible defects $I_{edg\_pd\text{-}r}$) the presence of edges representative of defects that were partially eliminated from the dilation and comparison operation, but it is also possible that the restoration module 155 is such to add once again (in the edge image of restored possible defects $I_{edg\_pd\text{-}r}$) the edges representative of non-defective elements (which had been previously eliminated by means of the comparison module 154).

By means of the post-filtering module, the edges representative of non-defective elements are once again eliminated, thus preventing them from being erroneously considered as edges of possible defects by the defect detection module 156.

According to a fourth variant of the first, second or third embodiment, the processing unit further comprises a compensation module (not shown in FIGS. 4A-4C) interposed between the alignment module 151 and the edge extraction module 152.

The compensation module has the function of carrying out a compensation of the light of the aligned sample image $I_{cmp\_al}$: in this manner, the contrast of the aligned sample image $I_{cmp\_al}$ is increased, obtaining an improved image for the subsequent processing of the edge extraction module 152.

Preferably, a different compensation is carried out as a function of the type of surface portion of the sample tyre:

for example, in the case of a surface portion of the tread, this is substantially flat and hence the intensity of the light radiation emitted by the light source 131 is substantially constant over the entire surface portion of the tread: therefore a multiplication can be carried out with regard to the light intensity of the pixels of the aligned sample image $I_{cmp\_al}$ with a constant value that is equal for all the pixels;

in the case however of a surface portion of the shoulder, this is curved and thus the intensity of the light radiation emitted by the light source 131 tends to proportionally decrease with the distance of the surface from the camera 141: a therefore multiplication can be carried out with regard to the light intensity of the pixels of the aligned sample image $I_{cmp\_al}$ with an interpolation function, e.g. exponential, between two values.

According to a fifth variant of the first, second or third embodiment, the processing unit further comprises a filtering module (not shown in FIGS. 4A-4C) interposed between the alignment module 151 and the edge extraction module 152. The filtering module has the function of carrying out a filtering, e.g. of Gaussian type, in order to eliminate the high-frequency noise.

Advantageously, the width of the surface of the surface portion to be analysed is divided into a plurality of substantially annular bands which are extended around the rotation axis of the sample tyre along a part or along the entire circumferential surface to be analysed and have a substantially constant width: in this manner, it is possible to speed up the acquisition of the images and the processing of the acquired images, so as to allow carrying out the control of the sample tyre in line. Therefore, considering in particular the method, this further comprises subdividing the width of the surface of said portion into a plurality of substantially annular bands having a substantially constant width, and repeating steps of the method for detecting defects for each band of the plurality of bands.

Preferably, two contiguous bands are at least partially circumferentially superimposed on each other, i.e. they are superimposed in the direction defined by the tangent to the circumferential surface of the bands.

Preferably, the surface portion to be analysed is extended around the rotation axis of the tyre along the entire circumferential surface of the finished tyre (such as in the case of the tread) or of the green tyre (such as the external surface at the tread) and hence the plurality of bands are extended around the rotation axis of the sample tyre along the entire circumferential surface of the finished or green tyre.

The operation of a tyre production line 1 according to the second embodiment of the invention will now be described, also with reference to FIGS. 1A, 2, 3A, 3C, 3D, 3E, 4B, 5A-5B.

For the purpose of explaining the invention, it is assumed to analyse the tread of a sample finished tyre 103 which has a cut $D_1$, a scratch $D_2$ and three non-defective elements E1, E2, E3, as shown in FIG. 6A; more particularly, for the sake of simplicity, it is assumed to acquire the image of only one band of the tread, in which the band is extended around the rotation axis of the tyre along the entire circumferential surface of the tread.

It is also assumed to use only one camera 141 and an illuminator 131 for acquiring the images of the sample tyre to be controlled, mounted on a robotic arm 102.

When the working station 10 has completed the building of a green tyre, the moulding and curing station 20 receives the green tyre and starts carrying out the moulding and curing of the tyre.

The sample finished tyre 103 is thus generated.

The control station 30 receives the finished sample tyre 103 exiting from the moulding and curing station 20 and starts the control of the finished tyre for the purpose of detecting the presence of defects on the tread.

In particular, the sample tyre 103 to be analysed is abutted against the support and movement member 101 and starts to be rotated around its rotation axis; simultaneously, the light source 131 generates the light radiation $R_d$ that illuminates a band of the tread of the sample tyre 103, then the camera 141 receives the radiation reflected from the band and acquires the image of the band of the tread while the sample tyre 103 carries out a complete rotation around its rotation axis.

The processing unit 150 processes the acquired image of the band of the tread as explained above for the second embodiment, and detects the presence of the cut $D_1$.

In particular, the processing unit 150 calculates the edge measurement profile around the cut $D_i=D_1$ as shown in FIG. 5A and calculates the edge measurement profile around the non-defective element $E_i=E_1$ (or $E_i=E_2$ and $E_i=E_3$), as shown in FIG. 5B.

Subsequently, the processing unit 150 generates the test result signal $S_{et1}$ which indicates that the sample tyre 103 is defective and generates the defects signal $I_{df}$ which represents the acquired image $I_{cmp}$ of the sample tyre, on which the representation of the cut $D_1$ enclosed with a square is superimposed.

It is observed that, for the sake of simplicity, the operation relating to only one band of the surface of the tread of the sample tyre 103 has been illustrated, but more generally the width of the surface of the tread of the sample tyre 103 is subdivided into a plurality of bands. In this case, a complete rotation of the sample tyre 103 is carried out around its rotation axis and at the end of the rotation, the image has been acquired of all the bands of the surface of the tread of the sample tyre 103. Subsequently, the processing unit 150 carries out the processing of the acquired image and generates therefrom a plurality of images, each corresponding to a band. Subsequently, for each image of a band the processing unit 150 carries out the processing as illustrated above. Alternatively, the calculation can be carried out in parallel by means of a plurality of cameras 141.

Naturally, such example can be generalised for the analysis of any portion of the external surface of the finished tyre and/or of the green tyre.

The invention claimed is:

1. Method for detecting defects on tyres in a tyre production process, the method comprising:

a) receiving a reference image ($I_{ref}$) of a surface portion of a reference tyre;

b) providing a sample tyre to be analysed;

c) illuminating a surface portion of the sample tyre with a raking light source;

d) acquiring a sample image ($I_{cmp}$) of the illuminated surface portion of the sample tyre;

e) extracting the edges from the reference image and from the sample image and generating an edge reference image ($I_{ref\_edg}$) comprising the edges included in the reference image and an edge sample image ($L_{cmp\_edg}$) comprising the edges included in the sample image, respectively;

f) carrying out a dilation of the edges of the edge reference image ($I_{ref\_edg}$) and generating therefrom a dilated edge reference image ($I_{ref\_edg\_dl}$);

g) comparing the edge sample image ($I_{cmp\_edg}$) with respect to the dilated edge reference image ($I_{ref\_edg\_dl}$) and generating an edge image of possible defects ($I_{edg\_pd}$) comprising the edges that are included in the edge sample image and are not included in the dilated edge reference image;

h) identifying as possible defects the edges included in the edge image of possible defects.

2. Method according to claim 1, further comprising:

i) selecting a first edge ($C'_{D1}$) from the edge image of possible defects ($I_{edg\_pd}$), identifying in the edge sample image ($I_{cmp\_edg}$) a first edge corresponding to the first selected edge and verifying the presence of at least one portion of a second edge in the edge sample image ($I_{cmp\_edg}$), wherein a portion of the second edge is in the proximity of at least one portion of the first corresponding edge;

j) generating an edge image of restored possible defects ($I_{edg\_pd-r}$) comprising the edges of the edge image of possible defects and comprising the second identified edge;

k) repeating the preceding steps i)-j) for further first edges of the edge image of possible defects;

l) identifying as defects the edges included in the edge image of restored possible defects.

3. Method according to claim 2, wherein in step i) the calculation of the proximity between the first corresponding edge and the second edge comprises:

measuring a plurality of distances by means of measuring the distance between points belonging to the first corresponding edge and points belonging to the second edge;

identifying the minimum distance between the plurality of measured distances;

and wherein in step i) said verification of the presence of the second edge occurs if the minimum distance is less than or equal to the value of a distance threshold.

4. Method according to claim 3, wherein step i) comprises:

i1) associating, with each first corresponding edge of the edge sample image, an orientation defined as the direction perpendicular to the average direction of the considered edge;

i2) associating, with each second edge of the edge sample image, an orientation defined as the direction perpendicular to the average direction of the considered edge;

i3) verifying if the orientation of the first corresponding edge is substantially parallel to the orientation of the selected second edge;

and wherein said generation in step j) is executed if the verification in step i3) is positive.

5. Method according to claim 2, further comprising, after step k), the following steps:

receiving the edge image of restored possible defects;

identifying the presence of non-defective elements in the edge image of restored possible defects;

eliminating the identified non-defective elements.

6. Method according to claim 2, wherein step l) comprises:

l1) selecting an edge from the edge image of restored possible defects and generating a plurality of edge measurement profiles respectively centred on a plurality of different points belonging to the selected edge, the plurality of edge measurement profiles being associated with respective pluralities of values calculated as a function of the light intensity values of respective portions of the sample image ($I_{cmp}$) respectively centred on said plurality of points;

l2) selecting an edge measurement profile from the plurality of edge measurement profiles and identifying a possible defective point as a function of the trend of the selected edge measurement profile;

l3) repeating the step l2) for further edge measurement profiles of the selected edge;

l4) repeating the steps l1)-l3) for further edges of the edge image of restored possible defects;

l5) selecting an edge from the edge image of restored possible defects ($I_{edg\_pd-r}$) and calculating the number of the possible defective points belonging to the selected edge;

l6) marking the selected edge as a defect if said number of the possible defective points is greater than the value of a defect threshold;

l7) repeating the steps l5)-l6) for further edges selected from the edge image of restored possible defects ($I_{edg\_pd-r}$);

l8) generating a measured edges image ($I_{ms\_edg}$) comprising the edges marked as defects;

l9) identifying as defects the edges included in the measured edges image.

7. Method according to claim 6, the method comprising, between step d) and e), the step d1) of generating a filled sample image ($I_{cmp\_rp}$) obtained by filling the portions of the sample image representative of the grooves present on the tread of the sample tyre and generating a filled reference image ($I_{ref\_rp}$) obtained by filling the portions of the reference image representative of the grooves present on the tread of the reference tyre, and wherein the step e) carries out the extraction of the edges from the filled reference image and from the filled sample image and generates an edge reference image comprising the edges included in the filled reference image and an edge sample image comprising the edges included in the filled sample image respectively, and wherein the step l1) comprises generating a plurality of edge measurement profiles respectively centred on a plurality of different points belonging to the selected edge, the plurality of edge measurement profiles being associated with respective pluralities of values calculated as a function of the light intensity values of respective portions of the filled sample image respectively centred on said plurality of points.

8. Method according to claim 7, wherein in step l1) the plurality of edge measurement profiles associated with respective pluralities of calculated values is calculated as a function of the light intensity values of respective portions of the filled sample image ($I_{cmp\_rp}$) respectively centred on said plurality of points.

9. Method according to claim 6, wherein the value of the defect threshold is equal to a percentage of the length of the edge selected from the edge image of restored possible defects.

10. Method according to claim 1, wherein the defect is a substantially monodimensional cut,
and wherein the surface portions of the reference tyre and of the sample tyre are selected from between one of the following:
tread;
external shoulder.

11. Apparatus to detect defects on tyres in a tyre production line, the apparatus comprising:
a support and movement member having a support adapted to support a sample tyre and rotate it around a rotation axis thereof;
a light source configured to emit a light radiation ($R_d$) for raking illuminating a portion of the surface of the sample tyre during its rotation;
at least one camera configured to acquire a sample image ($I_{cmp}$) of the illuminated surface portion of the sample tyre during its rotation;
a memory configured to store a reference image ($I_{ref}$) of a surface portion of a reference tyre;
a processing unit configured to:
receive the sample image ($I_{cmp}$) of the illuminated surface portion of the sample tyre;
extract the edges from the reference image and from the sample image and generate an edge reference image ($I_{ref\_edg}$) comprising the edges included in the reference image and an edge sample image ($I_{cmp\_edg}$) comprising the edges included in the sample image, respectively;
carry out a dilation of the edges of the edge reference image ($I_{ref\_edg}$) and generate therefrom a dilated edge reference image ($I_{ref\_edg\_dl}$);
compare the edge sample image ($I_{cmp\_edg}$) with respect to the dilated edge reference image ($I_{ref\_edg\_dl}$) and generate an edge image of possible defects ($I_{edg\_pd}$) comprising the edges that are included in the edge sample image and are not included in the dilated edge reference image;
identify as possible defects the edges included in the edge image of possible defects.

12. Apparatus according to claim 11, wherein the processing unit is further configured to:
select a first edge ($C'_{D1}$) from the edge image of possible defects ($I_{edg\_pd}$), identify in the edge sample image ($I_{cmp\_edg}$) a first edge corresponding to the first selected edge and verify the presence of at least one portion of a second edge ($C_{D1}$) in the edge sample image ($I_{cmp\_edg}$), wherein a portion of the second edge is in the proximity of at least one portion of the first corresponding edge;
generate an edge image of restored possible defects ($I_{edg\_pd-r}$) comprising the edges of the edge image of possible defects and comprising the second identified edge;
repeat said selection of the first edge, said identification, said verification and said generation for further first edges of the edge image of possible defects;
identify as defects the edges included in the edge image of restored possible defects.

13. Apparatus according to claim 12, wherein the processing unit is further configured to:
select an edge from the edge image of restored possible defects and generate a plurality of edge measurement profiles respectively centred on a plurality of different points belonging to the selected edge, the plurality of edge measurement profiles being associated with respective pluralities of values calculated as a function of the light intensity values of respective portions of the sample image ($I_{cmp\_al}$) respectively centred on said plurality of points;
select an edge measurement profile from the plurality of edge measurement profiles and identify a possible defective point as a function of the trend of the selected edge measurement profile;
repeat, for further edge measurement profiles of the selected edge, the identification of the possible defective points;
repeat, for further edges of the edge image of restored possible defects, the identification of the possible defective points;
select an edge from the edge sample image of restored possible defects and calculate the number of possible defective points belonging to the selected edge;
mark the selected edge as a defect if said number of the possible defective points is greater than the value of a defect threshold;
repeat, for further edges selected from the edge image of restored possible defects, the calculation of the number of the possible defective points and the marking of the selected edge;
generate a measured edges image ($I_{ms\_edg}$) comprising the edges marked as defects;
wherein the apparatus comprises a screen configured to display a representation of the edges marked as defects.

14. Computer program comprising software code portions adapted to perform at least the steps e)-l) of the method according to claim 2, when said program is run on at least one computer.

15. Process for producing tyres, the process comprising:
building green tyres;
moulding and vulcanising the green tyres;
controlling the green and/or vulcanised tyres according to the method of claim 1.

16. Tyre production line, the line comprising:
a working station;
a moulding and curing station;
a control station comprising the apparatus to detect defects on the tyres according to claim 11.

* * * * *